United States Patent
Hwang et al.

(10) Patent No.: US 10,897,746 B2
(45) Date of Patent: Jan. 19, 2021

(54) METHOD AND WIRELESS DEVICE FOR PERFORMING POSITION MEASUREMENT IN NB IOT

(71) Applicant: LG ELECTRONICS INC., Seoul (KR)

(72) Inventors: Seunggye Hwang, Seoul (KR); Joonkui Ahn, Seoul (KR); Hyunho Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/333,210

(22) PCT Filed: Sep. 13, 2017

(86) PCT No.: PCT/KR2017/010030
§ 371 (c)(1),
(2) Date: Mar. 13, 2019

(87) PCT Pub. No.: WO2018/052239
PCT Pub. Date: Mar. 22, 2018

(65) Prior Publication Data
US 2019/0246371 A1      Aug. 8, 2019

Related U.S. Application Data

(60) Provisional application No. 62/454,048, filed on Feb. 3, 2017, provisional application No. 62/424,361, filed (Continued)

(51) Int. Cl.
*H04W 64/00*    (2009.01)
*H04W 72/04*    (2009.01)
(Continued)

(52) U.S. Cl.
CPC ......... *H04W 64/003* (2013.01); *H04J 11/00* (2013.01); *H04W 4/80* (2018.02); *H04W 64/00* (2013.01);
(Continued)

(58) Field of Classification Search
CPC ... H04W 64/003; H04W 72/04; H04W 64/00; H04W 4/80; H04W 72/0446;
(Continued)

(56) References Cited

U.S. PATENT DOCUMENTS 10,285,153 B2 *   5/2019   Kim ................... G01S 5/0236
2012/0327856 A1   12/2012  Jung et al.
(Continued)

FOREIGN PATENT DOCUMENTS

CN      101616360       12/2009
CN      103141136        6/2013
(Continued)

OTHER PUBLICATIONS

PCT International Application No. PCT/KR2017/010030, International Search Report dated Dec. 19, 2017, 12 pages.
(Continued)

*Primary Examiner* — Brian T O Connor
(74) *Attorney, Agent, or Firm* — Lee Hong Degerman Kang Waimey

(57) ABSTRACT

The disclosure of the present specification provides a method whereby a wireless device performs position measurement. The method may comprise the step of receiving information including settings for a narrowband positioning reference signal (NPRS). The information may include a list of carriers for the NPRS. The list of carriers may indicate physical resource blocks (PRBs) in which the NPRS is received. The method may comprise the step of determining that the geometry of the carriers is collocated.

6 Claims, 14 Drawing Sheets

Related U.S. Application Data on Nov. 18, 2016, provisional application No. 62/405,267, filed on Oct. 7, 2016, provisional application No. 62/400,596, filed on Sep. 27, 2016, provisional application No. 62/393,657, filed on Sep. 13, 2016.

(51) Int. Cl.
*H04J 11/00* (2006.01)
*H04W 4/80* (2018.01)
*H04W 80/08* (2009.01)

(52) U.S. Cl.
CPC ....... *H04W 72/04* (2013.01); *H04W 72/0446* (2013.01); *H04W 72/0453* (2013.01); *H04W 80/08* (2013.01); *Y02D 30/70* (2020.08)

(58) Field of Classification Search
CPC ... H04W 72/0453; H04W 80/08; H04J 11/00; Y02D 70/126; Y02D 70/124; Y02D 70/10; Y02D 70/00; Y02D 70/12
See application file for complete search history.

(56) References Cited

U.S. PATENT DOCUMENTS

| | | | | |
|---|---|---|---|---|
| 2013/0294402 A1* | 11/2013 | Yoon | ...................... | H04W 64/00 370/330 |
| 2014/0274126 A1* | 9/2014 | Sendonaris | ........... | H04W 64/00 455/456.1 |
| 2015/0181549 A1* | 6/2015 | Batada | ...................... | G01S 5/14 455/456.1 |
| 2016/0223639 A1 | 8/2016 | Davydov et al. | | |
| 2017/0289953 A1 | 10/2017 | Chae | | |
| 2017/0318554 A1* | 11/2017 | Kim | ...................... | G01S 5/0236 |
| 2018/0020423 A1* | 1/2018 | Wang | ...................... | H04W 64/00 |
| 2018/0294934 A1* | 10/2018 | Kim | ........................ | H04L 5/005 |

FOREIGN PATENT DOCUMENTS

| | | |
|---|---|---|
| CN | 104303440 | 1/2015 |
| CN | 105472735 | 4/2016 |
| EP | 3165938 | 5/2017 |
| KR | 1020120046217 | 5/2012 |
| KR | 1020150029024 | 3/2015 |
| KR | 1020160057336 | 5/2016 |
| WO | 2013170227 | 11/2013 |
| WO | 2016003154 | 1/2016 |
| WO | 2016032308 | 3/2016 |
| WO | 2016133719 | 8/2016 |

OTHER PUBLICATIONS

3rd Generation Partnership Project (3GPP), "Technical Specification Group Radio Access Network; Evolved Universal Terrestrial Radio Access (E-UTRA); Physical channels and modulation (Release 13)," 3GPP TS 36.211 V13.2.0, Jun. 2016, 172 pages.

The State Intellectual Property Office of the People's Republic of China Application Serial No. 201780055950.6, Office Action dated May 28, 2020, 6 pages.

ZTE, "OTDOA support for NB-IoT", R1-167323, 3GPP TSG RAN WG1 Meeting #86, Aug. 2016, 7 pages.

European Patent Office Application Serial No. 17851113.5, Search Report dated Jan. 15, 2020, 17 pages.

ITL, "Support of OTDOA in NB-IoT", 3GPP TSG RAN WG1 Meeting #86, R1-167752, Aug. 2016, 9 pages.

* cited by examiner

METHOD AND WIRELESS DEVICE FOR PERFORMING POSITION MEASUREMENT IN NB IOT

CROSS-REFERENCE TO RELATED APPLICATIONS

This application is the National Stage filing under 35 U.S.C. 371 of International Application No. PCT/KR2017/0010030, filed on Sep. 13, 2017, which claims the benefit of U.S. Provisional Application No. 62/393,657, filed on Sep. 13, 2016, 62/400,596, filed on Sep. 27, 2016, 62/405,267, filed on Oct. 7, 2016, 62/424,361, filed on Nov. 18, 2016, and 62/454,048, filed on Feb. 3, 2017, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

A physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile recently, Internet of Things (IoT) communication has been attracted. The IoT refers to communications that do not involve human interaction. A discussion is beginning to be made to accommodate such IoT communications in a cellular-based LTE system.

However, since the existing LTE system has been designed for the purpose of supporting high-speed data communication, it has been regarded as an expensive communication method.

However, IoT communication can be widely used only if the price is low due to its characteristics.

Thus, there have been discussions to reduce bandwidth as part of cost savings. This is referred to as a NB (narrow band) IoT. The NB IoT can communicate using only one PRB (Physical Resource Block).

However, an overload issue may be generated when many NB-IoT devices are connected to one PRB.

SUMMARY OF THE INVENTION

Accordingly, a disclosure of the present specification has been made in an effort to solve the aforementioned problem.

To achieve the foregoing purposes, the disclosure of the present invention proposes a method for measuring a position. The method may be performed by a wireless device and comprise: receiving information including configuration of a narrowband positioning reference signal (NPRS). The information includes a list of carriers for the NPRS. The list of carriers may indicate physical resource blocks (PRBs) on each of which the NPRS is received. The method may comprise: determining that geometries for the carriers are collocated.

The information may include a list of carriers of a serving cell and a list of carriers of a neighbor cell.

The determining may include: determining that geometries for the carriers of the serving cell are collocated; and determining that geometries for the carriers of the neighbor cell are collocated.

The geometries for the carriers may include physical characteristics of the carriers or antenna ports.

PRBs indicated by the list may have geometries that can be considered to be collocated.

The information may be received through higher layer signaling.

When a PRB indicated by the list is a non-anchor PRB, a downlink channel or an uplink channel on the PRB may be received on a plurality of subframes or slots with a higher repetition number.

To achieve the foregoing purposes, the disclosure of the present invention proposes a wireless device for measuring a position. The wireless device may comprise: a transceiver; and a processor configured to control the transceiver. The processor may be configured to perform processes which include receiving information including configuration of a narrowband positioning reference signal (NPRS). The information may include a list of carriers for the NPRS. The list of carriers may indicate physical resource blocks (PRBs) on each of which the NPRS is received. The processes may include determining that geometries for the carriers are collocated.

According to the disclosure of the present invention, the problem of the conventional technology described above may be solved.

DESCRIPTION OF EXEMPLARY EMBODIMENTS

Figure 1:
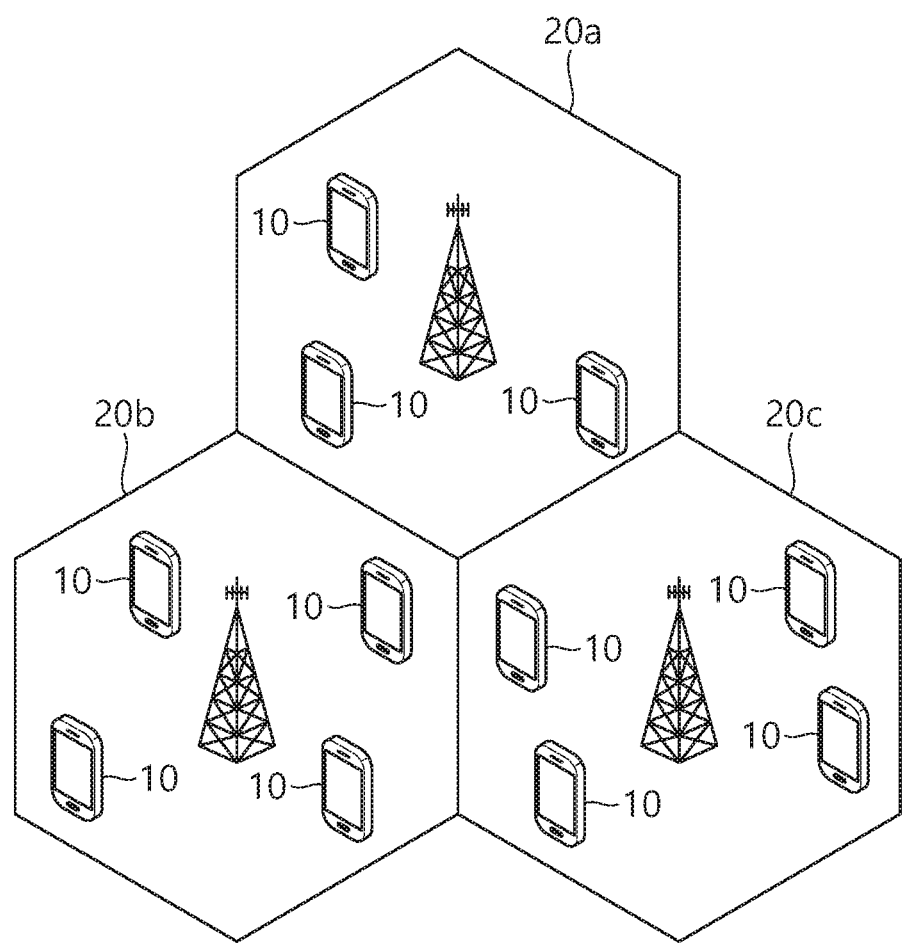
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms "first" and "second" are used for the purpose of explanation about various components, and the components are not limited to the terms "first" and "second". The terms "first" and "second" are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but should not be intended to be limiting of the invention. It should be understood that the spirit of the invention may be expanded to its modifications, replacements or equivalents in addition to what is shown in the drawings.

As used herein, "base station" generally refers to a fixed station that communicates with a wireless device and may be denoted by other terms such as eNB (evolved-NodeB), BTS (base transceiver system), or access point.

As used herein, "user equipment (UE)" may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
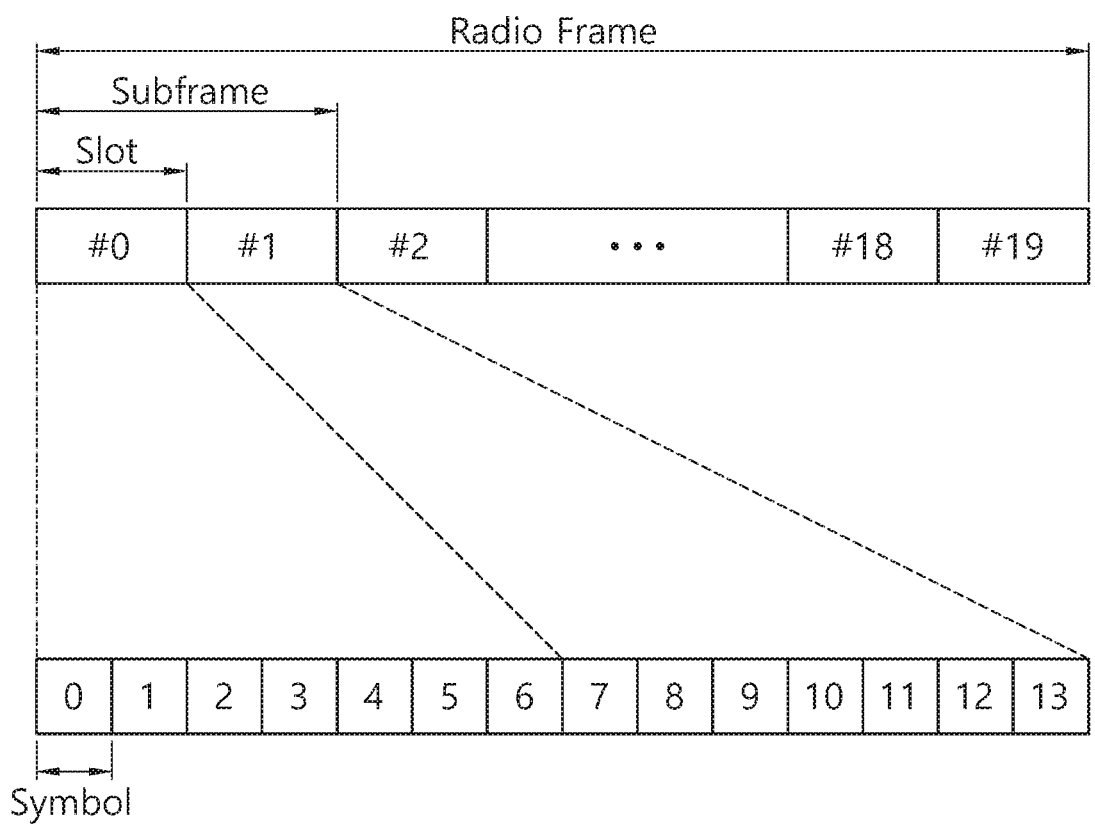
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

Figure 3:
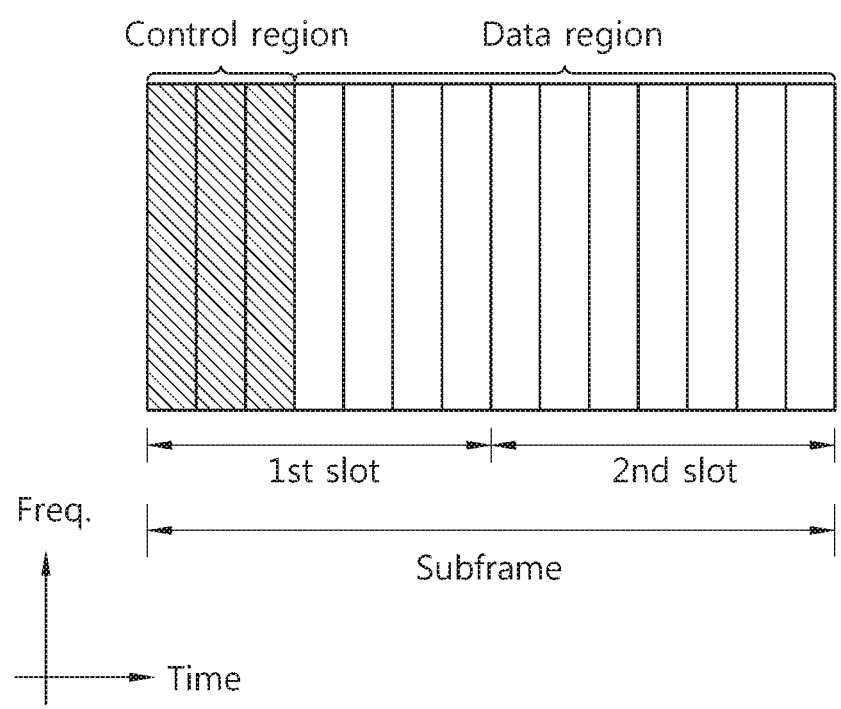
FIG. 3 illustrates a downlink subframe structure.

FIG. 3 illustrates the architecture of a downlink subframe.

In FIG. 3, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

A base station determines a PDCCH format according to DCI to be sent to an NB IoT device and attaches a CRC (Cyclic Redundancy Check) to control information. The CRC is masked with a radio network temporary identifier (RNTI) according to the owner or purpose of a PDCCH. In the case of a PDCCH for a specific NB IoT device, a CRC may be masked with a unique identifier of the NB IoT device, for example, a C-RNTI (cell-RNTI). In the case of a PDCCH for a paging message, a CRC may be masked with a paging indication identifier, for example, a P-RNTI (paging-RNTI). In the case of a PDCCH for a system information block (SIB), a CRC may be masked with an SI-RNTI (system information-RNTI). To indicate a random access response that is a response to random access preamble transmission of an NB IoT device, a CRC may be masked with an RA-RNTI (random access-RNTI).

In 3GPP LTE, blind decoding is used for PDCCH detection. Blind decoding is a method of demasking a CRC of a received PDCCH (referred to as a candidate PDCCH) using a desired identifier and checking a CRC error to check whether the PDCCH is a control channel for the corresponding device. The base station attaches a CRC to DCI to be sent to a wireless device after determining a PDCCH format according to the DCI and masks the CRC with an RNTI according to the owner or purpose of a PDCCH.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the selenic component carrier.

<OTDOA>

In a cellular communication system, various methods by which a network acquires positional information of a UE are used in general. Typically, there is a method by which a UE receives configuration information related to a positioning reference signal (PRS) of an eNB through higher layer signaling, measures PRSs transmitted from cells around the UE to calculate information about the location of the UE according to a positioning technique such as OTDOA (Observed Time Difference Of Arrival) and delivers the information to a network in LTE. In addition, there are methods such as A-GNSS (Assisted Global Navigation Satellite System) positioning technique, E-CID (Enhanced Cell-ID) techniques, UTDOA (Uplink Time Difference of Arrival), etc. and these positioning methods can be used for various location-based services (e.g., advertisements, location tracking, emergency communication means, etc.)

OTDOA is a method of providing information about a reference cell and neighbor cells to a UE such that the UE measures and reports relative time differences between the reference cell and the neighbor cells through a specific signal (e.g., PRS) and then positioning the UE on the basis of the relative time differences.

Figure 4:
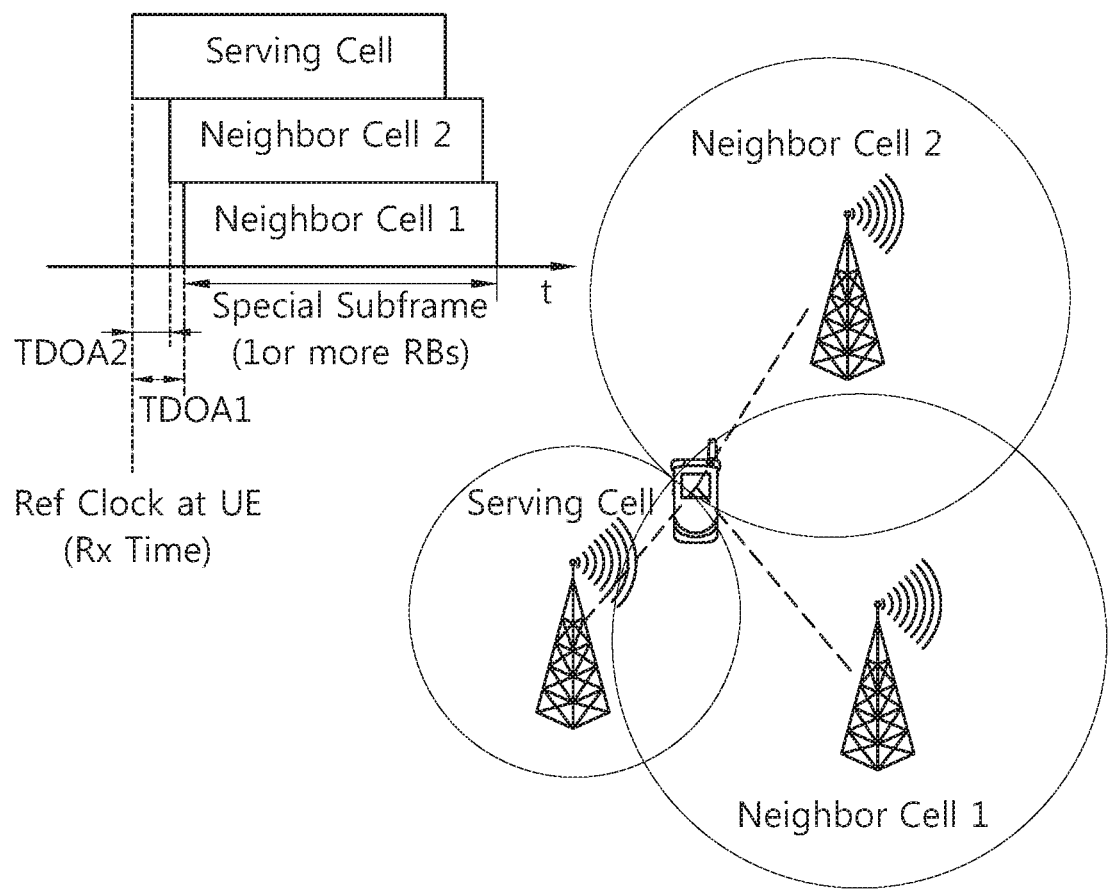
FIG. 4 illustrates an example of an operation of a downlink OTDOA (Observed Time Difference Of Arrival) method among ground position based methods.

FIG. 4 illustrates an example of an operation of OTDOA (Observed Time Difference of Arrival) among ground location-based methods.

A UE measures a reference clock on the basis of a subframe transmitted from a serving cell that currently provides a service to the UE. A subframe is received from a second neighbor cell at a time elapsed from the reference clock by TDOA2. A subframe is received from a first neighbor cell at a time elapsed from the reference clock by TDOA1 longer than TDOA2. Subframes transmitted from a plurality of cells may include PRSs.

The UE can estimate the location thereof using a difference between reception times of PRSs received from the serving cell and a neighbor cell. A reference signal time difference (RSTD) between a neighbor cell j and a reference cell i can be defined as $T_{subframeRxj}-T_{subframeRxi}$. Refer to 3GPP TS 36.214 V9.1.0 (2010-03) 5.1.12 for details. $T_{subframeRxj}$ indicates a time when a UE has received the start point of one subframe from the cell j and $T_{subframeRxi}$ indicates a time when a UE has received the start point of one subframe temporally closest to the subframe received from the cell j from the cell i. A reference point for RSTD measurement may be an antenna connector of the UE.

<IoT (Internet of Things) Communication>

Hereinafter, the IoT will be described.

Figure 5A:
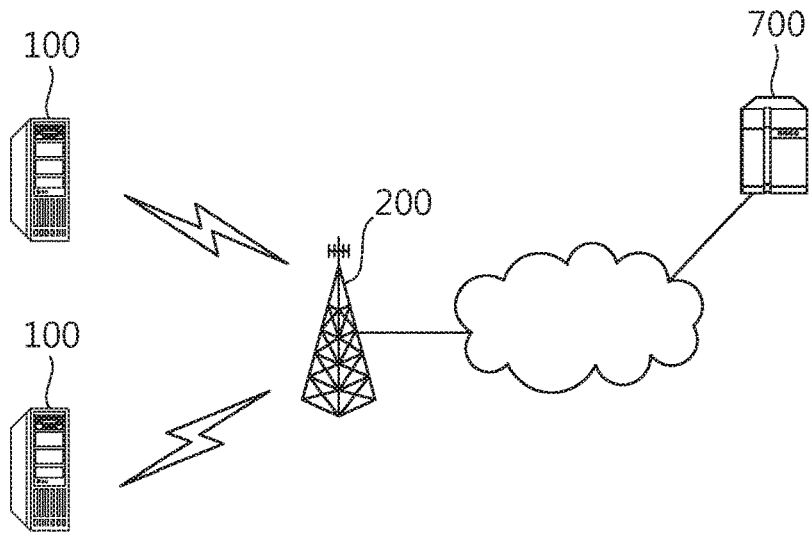
FIG. 5A illustrates an example of IoT (Internet of Things) communication.

FIG. 5A illustrates an example of IoT (Internet of Things) communication.

The IoT refers to information exchange between the IoT devices 100 without human interaction through the base station 200 or information exchange between the IoT device 100 and the server 700 through the base station 200. In this way, the IoT communication may be also referred to as Cellular Internet of Things (CIoT) in that it communicates with a cellular base station.

Such IoT communication is a type of MTC (machine type communication). Therefore, the IoT device may be referred to as an MTC device.

The IoT service is distinct from the service in the conventional human intervention communication and may include various categories of services such as tracking, metering, payment, medical service, and remote control. For example, the IoT services may include meter reading, water level measurement, use of surveillance cameras, inventory reporting of vending machines, and so on.

Since the IoT communication has a small amount of data to be transmitted and uplink or downlink data transmission and reception rarely occur, it is desirable to lower the cost of the IoT device 100 and reduce battery consumption depending on a low data rate. Further, since the IoT device 100 has low mobility characteristics, the IoT device 100 has characteristics that the channel environment changes little.

Figure 5B:
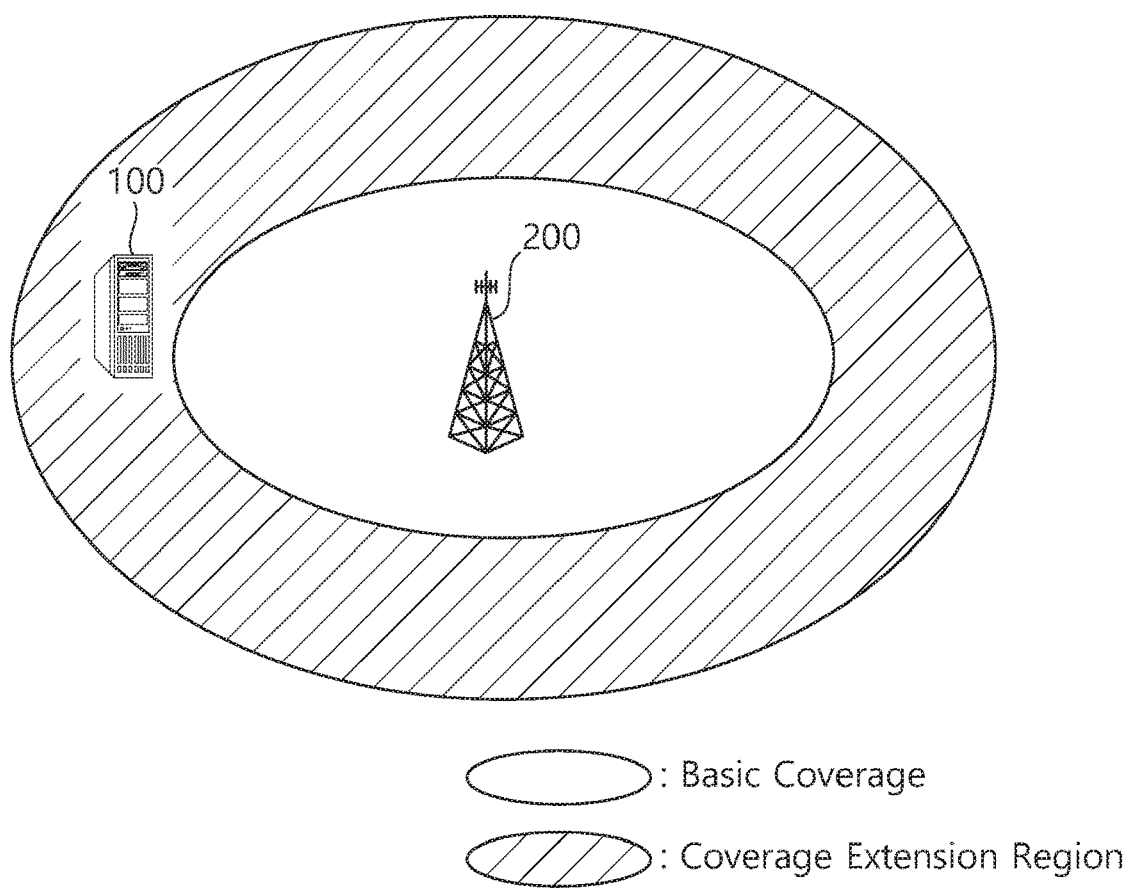
FIG. 5B is an illustration of cell coverage expansion or augmentation for an IoT device.

FIG. 5B is an illustration of cell coverage expansion or augmentation for an IoT device.

Recently, expanding or augmenting the cell coverage of the base station for the IoT device 100 has been considered, and various techniques for expanding or increasing the cell coverage have been discussed.

However, when the coverage of the cell is expanded or increased, if the base station transmits a downlink channel to the IoT device located in the coverage extension (CE) or coverage enhancement (CE) region, then the IoT device has difficulty in receiving it. Similarly, when an IoT device located in the CE region transmits an uplink channel, the base station has difficulty in receiving it.

In order to solve this problem, a downlink channel or an uplink channel may be repeatedly transmitted over multiple subframes. Repeating the uplink/downlink channels on multiple subframes is referred to as bundle transmission.

Figure 5C:
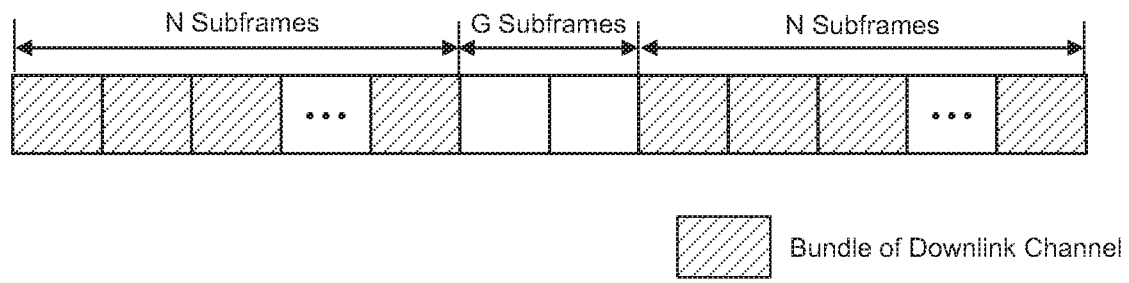
FIG. 5C is an illustration of an example of transmitting a bundle of downlink channels.

FIG. 5C is an illustration of an example of transmitting a bundle of downlink channels.

As seen with reference to FIG. 5D, an eNB repeatedly transmits downlink channels (e.g., a PDCCH and/or a PDSCH) to an IoT device 100 located in a coverage extended area on a plurality of subframes (e.g., N subframes).

Then, the IoT device or the eNB may receive a bundle of downlink/uplink channels on a plurality of subframes and decode the whole bundle or a part thereof to improve a decoding success rate.

Figure 6A:
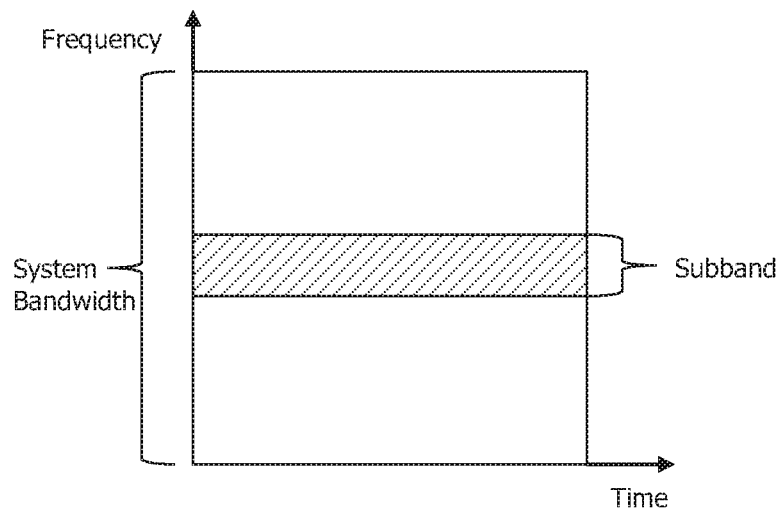
FIGS. 6A and 6B are diagrams illustrating examples of sub-bands in which IoT devices operate.
Figure 6B:
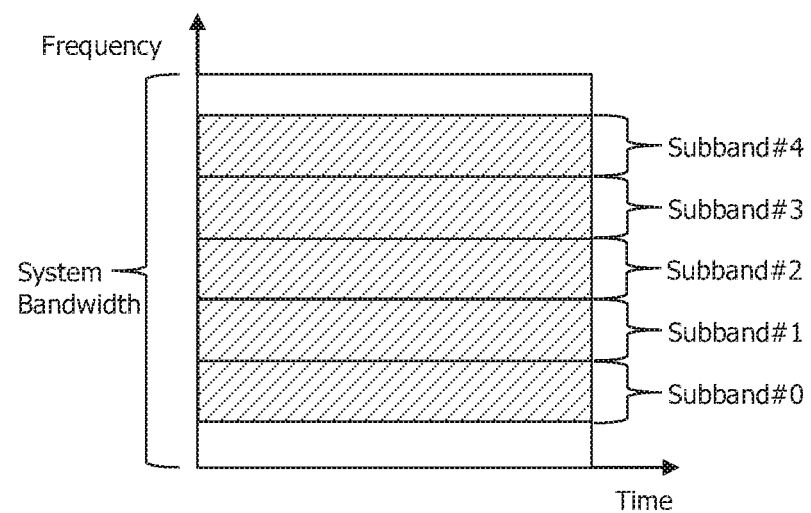

FIGS. 6A and 6B are diagrams illustrating examples of sub-bands in which IoT devices operate.

As one method for low-cost IoT devices, regardless of the system bandwidth of the cell as shown in FIG. 5A, the IoT device may use a sub-band of about 1.4 MHz for example.

In this case, an area of the subband in which the IoT device operates may be positioned in a central region (e.g., six middle PRBs) of the system bandwidth of the cell as shown in FIG. 5A.

Alternatively, as shown in FIG. 5B, a plurality of sub-bands of the IoT device may be used in one sub-frame for intra-subframe multiplexing between IoT devices to use different sub-bands between IoT devices. In this case, the majority of IoT devices may use sub-bands other than the central region of the system band of the cell (e.g., six middle PRBs).

The IoT communication operating on such a reduced bandwidth can be called NB (Narrow Band) IoT communication or NB CIoT communication.

Figure 7:
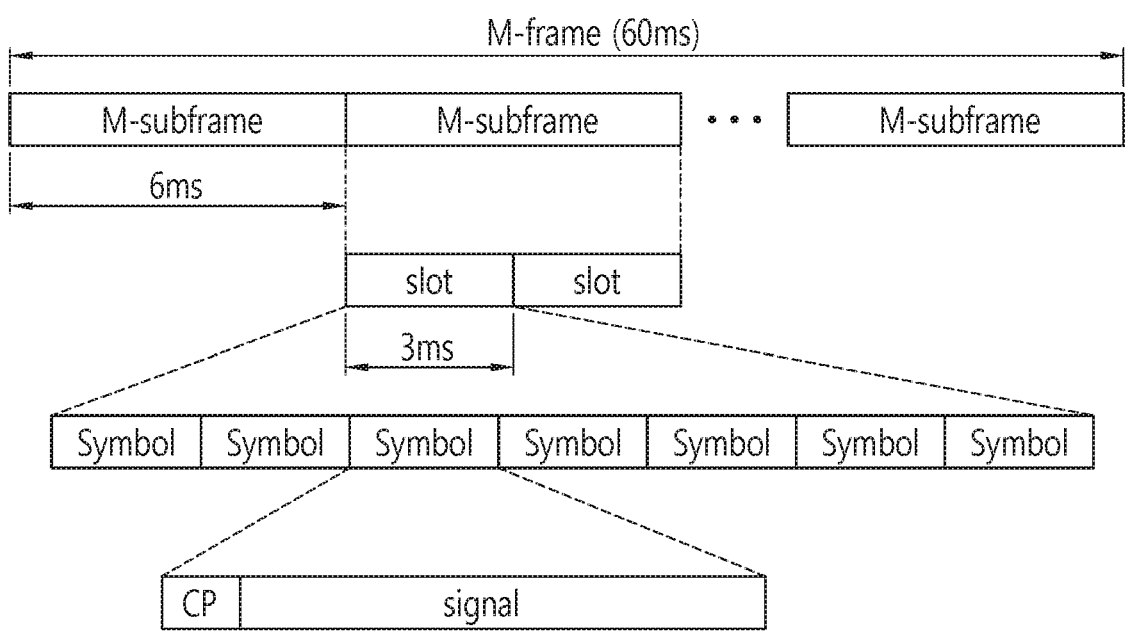
FIG. 7 illustrates an example of time resources that can be used for NB-IoT in M-frame units.

FIG. 7 illustrates an example of time resources that can be used for NB-IoT in M-frame units.

Referring to FIG. 7, a frame that may be used for the NB-IoT may be referred to as an M-frame, and the length may be illustratively 60 ms. Also, a subframe that may be used for the NB IoT may be referred to as an M-subframe, and the length may be illustratively 6 ms. Thus, an M-frame may include 10 M-subframes.

Each M-subframe may include two slots, and each slot may be illustratively 3 ms.

However, unlike what is shown in FIG. 7, a slot that may be used for the NB IoT may have a length of 2 ms, and thus the subframe has a length of 4 ms and the frame may have a length of 40 ms. This will be described in more detail with reference to FIG. 7.

Figure 8:
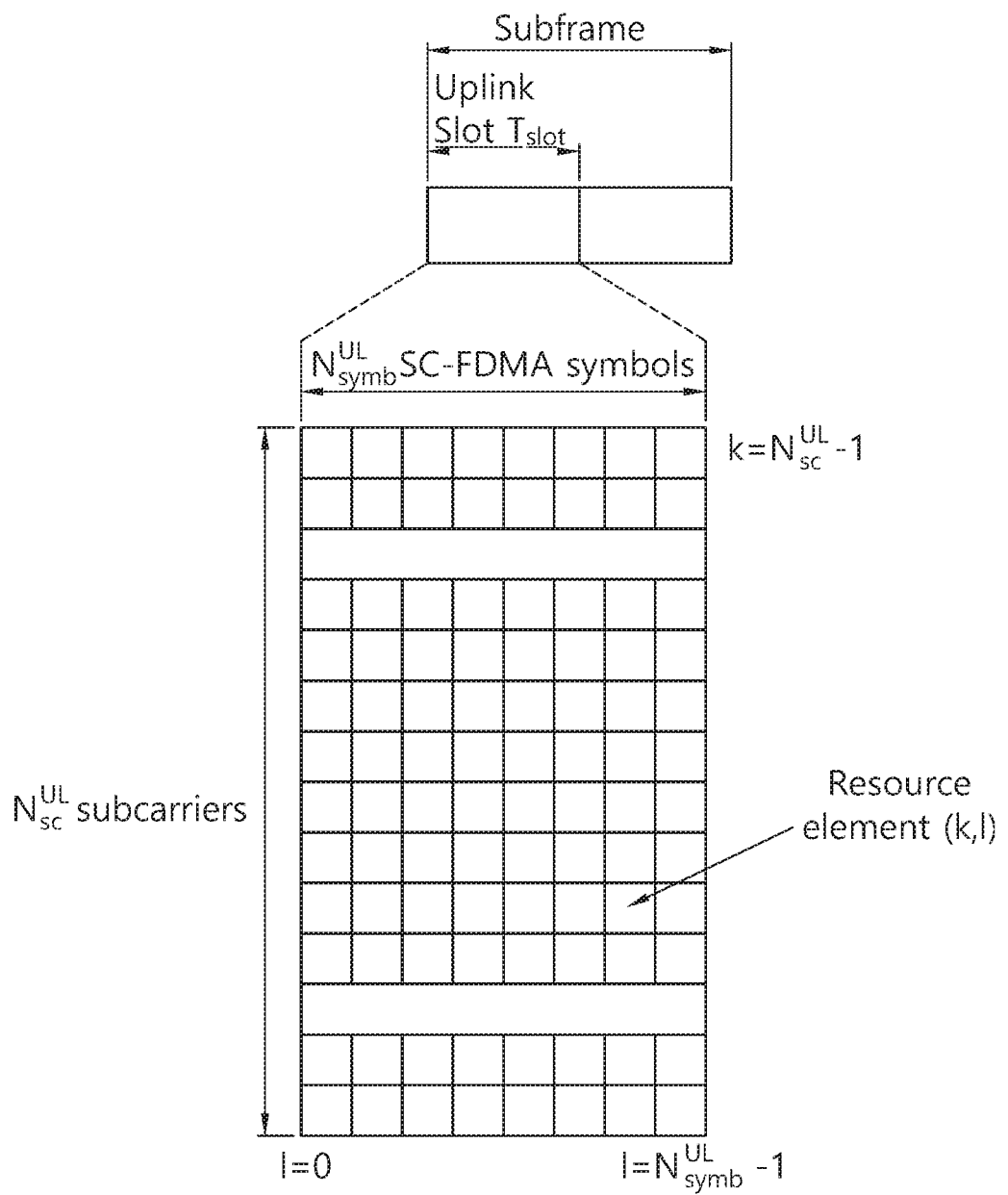
FIG. 8 is another illustration representing time resources and frequency resources that can be used for NB IoT.

FIG. 8 is another illustration representing time resources and frequency resources that can be used for NB IoT.

Referring to FIG. 8, a physical channel or a physical signal transmitted on slots on uplink of NB-IoT includes $N_{symb}^{UL}$ SC-FDMA symbols in the time domain and includes $N_{sc}^{UL}$ subcarriers in the frequency domain. Uplink physical channels may be classified into an NPUSCH (Narrowband Physical Uplink Shared Channel) and an NPRACH (Narrowband Physical Random Access Channel). In addition, a physical signal in NB-IoT may be an NDMRS (Narrowband Demodulation Reference Signal).

In NB-IoT, an uplink bandwidth of $N_{sc}^{UL}$ subcarriers for a slot $T_{slot}$ is as follows.

TABLE 1

| Subcarrier spacing | $N_{sc}^{UL}$ | $T_{slot}$ |
|---|---|---|
| Δf = 3.75 kHz | 48 | 61440 * $T_s$ |
| Δf = 15 kHz | 12 | 15360 * $T_s$ |

In NB-IoT, each resource element (RE) of a resource grid can be defined as an index pair (k, 1) in a slot when k=0, . . . , $N_{sc}^{UL}$-1 and 1=0, . . . , $N_{symb}^{UL}$-1 which indicate the time domain and the frequency domain.

In NB-IoT, downlink physical channels include an NPDSCH (Narrowband Physical Downlink Shared Channel), an NPBCH (Narrowband Physical Broadcast Channel) and an NPDCCH (Narrowband Physical Downlink Control Channel). In addition, downlink physical signals include an NRS (Narrowband Reference Signal), an NSS (Narrowband Synchronization Signal) and an NPRS (Narrowband Positioning Reference Signal). The NSS includes an NPSS (Narrowband Primary Synchronization Signal) and an NSSS (Narrowband Secondary Synchronization Signal).

Meanwhile, NB-IoT is a communication method for wireless devices that use a reduced bandwidth (i.e., narrowband) according to low complexity/low cost. Such NB-IoT communication aims at access of a large number of wireless devices on the reduced bandwidth. Furthermore, NB-IoT communication aims at support of wider cell coverage than the cell coverage of LTE.

Meanwhile, a subcarrier having the reduced bandwidth includes only one PRB when a subcarrier spacing is 15 kHz as seen with reference to Table 1. That is, NB-IoT communication can be performed using only one PRB. Here, a PRB accessed by a wireless device to receive NPSS/NSSS/NPBCH/SIB-NB on the assumption that NPSS/NSSS/NPBCH/SIB-NB are transmitted from an eNB may be called an anchor PRB (or anchor carrier). The wireless device may be allocated additional PRBs from the eNB in addition to the anchor PRB (or anchor carrier). Here, a PRB through which the wireless device does not expect reception of NPSS/NSSS/NPBCH/SIB-NB from the eNB among the additional PRBs may be called a non-anchor PRB (or non-anchor carrier).

A conventional NB-IoT device performs operations related to a paging signal (e.g., monitoring of an NPDCCH including scheduling information and reception of an NPDSCH including a paging signal) on the anchor PRB (or anchor carrier). However, when many NB-IoT devices access the anchor carrier, operations related to a paging signal excessively converge on the anchor carrier. To solve this problem, a method for allowing a procedure related to paging and a random access (i.e., NPRACH) procedure to be performed in the non-anchor PRB is under discussion.

Meanwhile, a method for allowing a multicast service, e.g., SC-PTM (Single-Cell Point-To-Multipoint) to be performed in the non-anchor PRB instead of the anchor PRB (or anchor carrier) is under discussion.

Furthermore, a method for allowing a positioning related procedure to be performed in the non-anchor PRB instead of the anchor PRB (or anchor carrier) is also under discussion.

Since the anchor PRB (or anchor carrier) is selected by an NB IoT device from PRBs in consideration of channel raster conditions, a channel state of the anchor PRB (or anchor carrier) can be considered to be satisfactory in general.

However, for improvement of operations related to paging and NPRACH and an operation such as multicasting such that the operations can be performed in a non-anchor PRB (or non-anchor carrier), there are problems that need to be considered. Specifically, in the case of an NB IoT device in an idle state, a channel state of a non-PRB (or non-anchor carrier) may not be satisfactory. In this case, when a common search space (CSS) in which control channels are transmitted is located on the non-anchor PRB, a UE may not correctly monitor the CSS. Similarly, when a physical signal for positioning is transmitted on the non-anchor PRB in a situation in which the channel of the non-anchor PRB (or non-anchor carrier) is not good, the UE may not perform positioning with sufficient accuracy. Here, a larger number of PRBs may be required for the UE to complete measurement with higher accuracy.

<Disclosure of Present Specification>

An object of the present specification is to provide a method for improving the performance of an NB IoT device in an idle state when the NB IoT device performs operations on a non-anchor PRB (or non-anchor carrier). More specifically, an object of the present specification is to provide a method for allowing an NB IoT device to effectively use a plurality of PRBs other than an anchor PRB. In the present specification, a PRB configured for a specific purpose is defined as a D-PRB (dedicated PRB or dynamic PRB) for convenience of description. A D-PRB may be selected from anchor PRBs (or anchor carriers) and non-anchor PRBs (or non-anchor carriers). Such a D-PRB can be used for paging, NPRACH, SC-PTM and/or positioning. Although the present specification is described on the assumption that an NB-IoT system is used for convenience of description, the concept proposed in the present specification is not limited to the NB-IoT system. For example, the concept proposed in the present specification can be applied to a situation in which frequency resources (e.g., a first PRB) used in a cell search step differ from frequency resources (e.g., a second PRB) in which actual downlink data is received.

Hereinafter, a device operating on a reduced bandwidth according to low complexity/low capability/low specification/low cost will be referred to as an LC device, a bandwidth reduced device or an NB-IoT device in the present specification. Alternatively, the device may also be referred to as a wireless device.

I. First Disclosure: Reconfiguration of D-PRB

When a D-PRB configured for an NB IoT device is not suitable to receive downlink data due to a channel state or the like, the NB IoT device may be allocated a new D-PRB through a feedback process.

Figure 9:
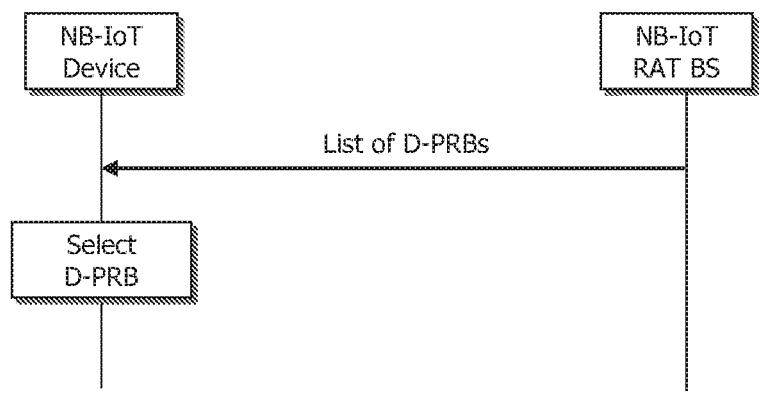
FIG. 9 illustrates a method of selecting a D-PRB according to a first disclosure of the present specification.

FIG. 9 illustrates a method of selecting a D-PRB according to a first disclosure of the present specification.

As seen with reference to FIG. 9, an NB IoT device can receive information about a list of available D-PRBs from an eNB using NB IoT RAT. The list can indicate indexes of the D-PRBs. The D-PRBs in the list may be non-anchor PRBs. The information about the D-PRB list may be received through a system information block (SIB). Further, the information about the D-PRB list may be received through an anchor PRB (or anchor carrier).

The NB IoT device selects a D-PRB to be used from the D-PRB list on the basis of selection criteria. The selection criteria may be predetermined such that additional signaling is not needed between the eNB and the NB IoT device. For example, the selection criteria may be criteria according to a value uniquely assigned to the NB IoT device, such as the ID of the NB IoT device or criteria according to a value uniquely assigned to a group of NB IoT devices that share a specific purpose. Alternatively, information about the selection criteria may be included in the SIB information and received from the eNB.

The NB IoT device checks the index of the selected D-PRB. If the D-PRB is a non-anchor PRB (or non-anchor carrier), the NB IoT device measures a channel state of the PRB. That is, when the index of the selected D-PRB indicates a non-anchor PRB, the NB IoT device measures the channel state of the PRB. As a method for measuring a channel state of a non-anchor PRB (or non-anchor carrier), an NRS (Narrowband Reference Signal) may be used. The NRS is provided all the time irrespective of the operation mode (e.g., in-band mode/guard-band mode/stand-alone mode) of NB-IoT and thus can be commonly used. If an LTE-based CRS is provided from the eNB, the NB IoT device may use the CRS for channel state measurement. A channel state measured through the NRS may be a value such as RSRP or RSRQ. When a measured value such as RSRP or RSRQ does not satisfy a specific threshold value, the NB IoT device can determine that the non-anchor PRB (or non-anchor carrier) is not suitable to receive downlink data. Here, the threshold value may be a value fixed in advance. Alternatively, the eNB may dynamically or semi-statically signal at least one of a plurality of available threshold values to the NB IoT device. For example, the eNB may signal the threshold value to the NB IoT device through SIB. The following mathematical expression represents a case in which the channel state does not satisfy the specific threshold value.

$$\text{Channel quality (e.g., } RSRP \text{ or } RSRQ) < Q_{threshold} \quad \text{[Mathematical expression 1]}$$

In this case, the NB IoT device can transmit feedback for changing the D-PRS to the eNB. An NB IoT device in an idle state can perform an operation such as NPRACH procedure in order to change a D-PRB to be monitored thereby. The NB IoT device may transmit corresponding information in the step of transmitting a third message (e.g., Msg3) of a random access procedure (i.e., message scheduled by a random access response) in order to indicate an NPRACH procedure for the purpose of changing the D-PRB to the eNB. Here, if D-PRBs for various purposes are required and different D-PRBs can be configured for respective purposes (e.g., paging, NPRACH and SC-PTM), the third message (e.g., Msg3) of the random access procedure may include information about the purpose of the request for changing the D-PRB. If a measurement result value with respect to the NRS received on the non-anchor PRB (or non-anchor carrier) is equal to or greater than the threshold value and thus the non-anchor PRB is determined to be a suitable PRB, the NB IoT device can use the non-anchor PRB (or non-anchor carrier) as a D-PRB without transmitting an additional signal.

When the measurement value does not satisfy the specific threshold value and thus the non-anchor PRB is determined to be an appropriate PRB or when feedback for changing the D-PRB is received, the eNB can perform one of the following four operations.

Operation A-1) Determining that the next D-PRB in the D-PRB list is used

Operation A-2) Determining that a D-PRB for high coverage enhancement (CE) is used Operation A-3) Increasing a repetition level with a D-PRB position fixed Operation A-4) eNB directly indicates a D-PRB to be used for NB IoT device.

The operation performed in A-1 is as follows. When a feedback for D-PRB configuration is transmitted and received, the NB IoT device and the eNB can determine that the D-PRB corresponding to the next index in the D-PRB list is used. Additional signaling after the feedback is not generated in this process, and the process can be repeated until the NB IoT device selects an appropriate D-PRB. Alternatively, the NB IoT device may sequentially perform NRS measurement on non-anchor PRBs (or non-anchor carriers) in the D-PRB, select a D-PRB suitable therefor and indicate the index of the D-PRB through feedback. If an anchor PRB (or anchor carrier) is included in the D-PRB list, the anchor PRB (or anchor carrier) can also be included in candidates selectable in the corresponding process. If an NPRACH procedure is used for feedback, the feedback operation can be performed through the anchor PRB (or anchor carrier) and an uplink PRB corresponding thereto or performed through a newly reconfigured D-PRB and an uplink PRB corresponding thereto.

The operation performed in A-2 is as follows. When the eNB transmits a D-PRB list through downlink signaling such as SIB, a D-PRB for supporting a specific coverage enhancement level may be included in the list. For example, a specific D-PRB can be designed for the purpose of supporting a repetition level different from those of other D-PRBs. This D-PRB may be for the purpose of supporting a wider coverage than those of other D-PRBs. When the NB IoT device transmits a feedback for D-PRB reconfiguration, the NB IoT device and the eNB can determine that a D-PRB supporting a higher coverage enhancement (CE) level in the D-PRB list is used. Additional signaling after the feedback is not generated in this process, and the process can be repeated until a maximum level is reached when one or more coverage enhancement (CE) levels are supported. Alternatively, the NB IoT device may perform NRS measurement on PRBs in the D-PRB lest in the order of coverage enhancement (CE) levels, and then select a D-PRB suitable therefor and signal the index of the selected D-PRB to the eNB through feedback. If an anchor PRB (or anchor carrier) is included in D-PRBs having higher coverage enhancement (CE) levels, the anchor PRB (or anchor carrier) can also be included in candidates selectable in the corresponding process. If an NPRACH procedure is used for the feedback operation of the NB IoT device, the feedback operation can be performed through the anchor PRB (or anchor carrier) and an uplink PRB corresponding thereto or performed through a newly reconfigured D-PRB having a higher coverage enhancement level and an uplink PRB corresponding thereto.

The operation performed in A-3 is as follows. Even when a feedback with respect to a channel state of a D-PRB has been transmitted and received, the NB IoT device and the eNB may not change the D-PRB. Instead, the eNB can increase a repetition level for the purpose of improving downlink reception capability when determining a common search space (CSS) for the NB IoT device. Information about a degree to which the repetition level increases may be transmitted through information that can be received by an NB IoT device in an idle mode, such as SIB. If an NPRACH procedure is used for a feedback operation of the NB IoT device, the NPRACH procedure for the feedback may be performed through an anchor PRB (or anchor carrier) and an uplink PRB corresponding thereto or performed through a D-PRB and an uplink PRB corresponding thereto while reflecting the increased repetition level therein. Here, a degree to which the repetition level increases may be designated by the eNB in the NPRACH procedure or determined at the request of the NB IoT device. Alternatively, the NPRACH procedure for the feedback may be performed through an anchor PRB (or anchor carrier) and an uplink PRB corresponding thereto.

The operation performed in A-4 is as follows. When the eNB determines a new D-PRB on the basis of a feedback from the NB IoT device, the eNB can signal an indication with respect to the new D-PRB to the NB IoT device. This information can be transmitted through a fourth message (e.g., Msg4) in an NPRACH procedure. Alternatively, the information may be transmitted through additional PDSCH allocation after the NPRACH procedure. Here, when the NPRACH procedure is used for the feedback operation of the NB IoT device, the NPRACH procedure for the feedback may be performed through an anchor PRB (or anchor carrier) and an uplink PRB corresponding thereto.

When the aforementioned operations proposed in this section are for the purpose of configuring a PRB for paging, a common search space (CSS) for monitoring a PDCCH including control information about a paging signal may be present on the PRB for paging. Further, a PDSCH including an actual paging signal may be present on the PRB for paging. When the NB IoT device initially accesses a system, the NB IoT device may select the PRB for paging on the basis of the ID of the PRB. When the PRB for paging is changed according to A-1 or A-2, change of the PRB for paging can be determined by a function of the ID of the NB IoT device and the number of attempts to reconfigure the paging PRB. When A-3 is applied, the index of the PRB for paging may not be changed. When A-4 is applied, the PRB for paging may be selected according to a PRB index indicated by the eNB. Here, the index of the PRB may be an index other than indexes in a list of non-anchor PRBs (or non-anchor carriers) transmitted through initial SIB.

When the aforementioned operations proposed in this section are for the purpose of configuring a PRB for supporting an NPRACH procedure, a PRB configured through the operations may be for the purpose of receiving the second message (e.g., Msg2) and the fourth message (e.g., Msg4) of the NPRACH procedure. An uplink PRB carrying the first message (i.e., a random access preamble) and the third message (e.g., a message scheduled by a random access response) of the NPRACH procedure may be an uplink PRB in a corresponding relationship with a downlink PRB for receiving the second message (e.g., Msg2) and the fourth message (e.g., Msg4) of the NPRACH procedure determined on the basis of the above-described operations. When a PRB for supporting the NPRACH procedure is configured, the NB IoT device can perform the aforementioned operations only when there is traffic to be transmitted thereby for the purpose of saving power. When PRB reconfiguration is for the purpose of securing a PRB having a high-reliability channel in advance, the NB IoT device can perform the aforementioned operations even if uplink traffic transmitted by the NB IoT device is not present. When the NB IoT device initially accesses the system, the NB IoT device can select a PRB for an NPRACH on the basis of the ID thereof. When the NB IoT device selects a PRB for an NPRACH on the basis of the ID thereof, the NB IoT device may select a PRB at the same position as a PRB for paging. Alternatively, the NB IoT device may select a PRB using a stand-alone PRB index designation method. Alternatively, the NB IoT device may select a PRB for an NPRACH on the basis of the coverage enhancement (CE) level thereof. When the NB IoT device performs selection on the basis of the coverage enhancement (CE) level thereof in this manner, the eNB can generate a PRB list for the NPRACH procedure and then deliver the PRB list to the NB IoT device such that PRB indexes can be distinguished according to various coverage enhancement (CE) levels.

When the PRB for the NPRACH procedure is changed through A-1 and A-2, change of the PRB can be determined by a function of the ID of the NB IoT device and the number of attempts to reconfigure the PRB. When A-3 is applied, the index of the PRB for the NPRACH procedure may not be changed. In the case of a combination with other operations, the PRB may be changed in response to PRB index according to combined operations. When A-4 is applied, the PRB for the NPRACH procedure can be determined according to the index of a PRB indicated by the eNB. Here, the index of the PRB may be an index other than indexes in a non-anchor PRB (or non-anchor carrier) list received through initial SIB.

When the aforementioned operations proposed in this section are performed for the purpose of reconfiguring a PRB for supporting multicast, the PRB can be used to receive control information and traffic information of SC-MCCH and/or SC-MTCH. In the case of SC-PTM, NB IoT devices sharing a specific service purpose or application may be configured to use the same PRB. Accordingly, when the above description is applied by a specific NB IoT device to reconfigure a PRB, the eNB can allow the NB IoT device to know changed PRB configuration information through signaling such as SIB change notification. When A-3 is applied, the eNB can increase repetition levels of all NB IoT devices that expect reception of information of SC-MCCH and/or SC-MTCH. When A-4 is applied, the eNB can allocate a new PRB and all NB IoT devices that expect reception of information of SC-MCCH and/or SC-MTCH can receive the information through the reconfigured PRB. Further, different PRBs for SC-MCCH and SC-MTCH may be determined and different PRBs may be used for services or applications.

II. Second Disclosure: D-PRB Hopping

To solve a low channel quality problem of a non-anchor PRB (or non-anchor carrier) without increasing additional signaling overhead, a D-PRB hopping method can be considered. In a method proposed in this section, an NB IoT device performs D-PRB hopping with time without fixing a D-PRB to one PRB to obtain frequency diversity effect. The NB IoT device can receive information about a list of available D-PRBs through SIB information on an anchor PRB (or anchor carrier). In addition, the NB IoT device can receive the D-PRB list as mentioned above and then select a D-PRB that satisfies a specific level. Here, PRB indexes in the D-PRB list may be ordered such that a hopping order can be determined.

II-1. Selection of Hopping PRB

The NB IoT device can select a D-PRB from the received D-PRB list using selection criteria that can be used without additional information exchange between the eNB and the NB IoT device and timing information at a monitoring time. Specific description is as follows.

Figure 10:
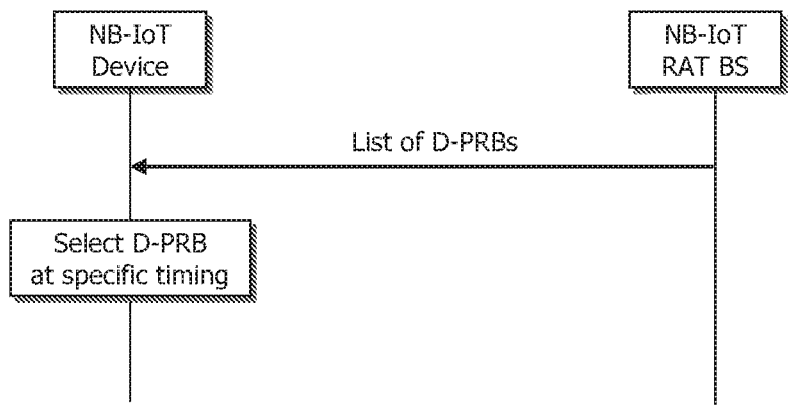
FIG. 10 illustrates a method of selecting a D-PRB to be used at a specific time when a D-PRB is hopped according to a second disclosure of the present specification.

FIG. 10 illustrates a method of selecting a D-PRB to be used at a specific time when D-PRBs hop according to the second disclosure of the present specification.

As seen with reference to FIG. 10, the eNB can transmit information about a list of hopping D-PRBs to the NB IoT device. Then, the NB IoT device can select a D-PRB to be used at a specific time according to specific criteria.

The D-PRB can be selected as follows. For example, the D-PRB can be selected on the basis of a unit value assigned to an NB IoT device, such as the ID of the NB IoT device, or a unique value assigned to a group of NB IoT devices sharing a specific purpose. As the timing information, time information (e.g., SFN) that is common between the eNB and an NB IoT device in an idle state and can be acquired by the NB IoT device during initial access can be used. For example, the eNB and the NB IoT can select a D-PRB using a function of an SFN and the ID of the NB IoT device. On the assumption that DRX (Discontinuous Reception) timing for a specific downlink signal has been determined, when the NB IoT device monitors a common search space (CSS) at an SFN suitable for intervals of DRX, PRBs that are monitoring targets can conform to the following mathematical expression.

$$IDX_{D\text{-}PRB} = f(UE_{ID}, SFN) \quad \text{[Mathematical expression 2]}$$

The method proposed in this section may cause stochastically different numbers of NB IoT devices to expect downlink signals in D-PRBs at a specific timing. For example, when one anchor PRB (or anchor carrier) and two non-anchor PRBs (nor non-anchor carriers) are included in a D-PRB list, the eNB can configure different numbers of NB IoT devices that monitor the anchor PRB (or anchor carrier) and the non-anchor PRBs (or non-anchor carriers) at a specific timing. When D-PRB hopping is performed such that the aforementioned configuration is performed, the following two methods may be considered.

B-1) Method Using Virtual Index
B-2) Method of Configuring Different D-PRB Groups Using D-PRB Grouping When the method of B-1 is used, the eNB can operate M actual D-PRBs and N (≥M) virtual PRB groups. The eNB can transmit a list (or the number) of virtual PRBs and a virtual PRB index order that can determine a hopping order together in a process of broadcasting a D-PRB list. In addition, the eNB can also signal a corresponding relationship between virtual PRBs and D-PRBs. Since it can be assumed that the number N of virtual PRBs is equal to or greater than the number M of actual D-PRBs, one D-PRB can correspond to one or more virtual PRBs. This corresponding relationship can be used to adjust the number of NB IoT devices that monitor a specific D-PRB. For example, it can be expected that the number of NB IoT devices allocated to D-PRBs corresponding to one virtual PRB is stochastically twice the number of NB IoT devices allocated to D-PRBs corresponding to two virtual PRBs. An NB IoT device and the eNB can determine an index of a virtual PRB to be used by the NB IoT device using the ID of the NB IoT device or a group ID of NB IoT devices and timing information (e.g., SFN) that can be used by NB IoT devices in an idle state without additional transmission and reception. For example, a method of determining a virtual PRB on the basis of the ID of an NB IoT device can be represented by the following mathematical expression.

$$IDX_{Virtual\ PRB} = f(UE_{ID}, SFN) \quad \text{[Mathematical expression 3]}$$

When the method of B-2 is used, different D-PRB lists may be set for respective NB IoT device or NB IoT device groups. To this end, the eNB can use L D-PRB lists. D-PRBs belonging to each D-PRB list may be selected with the same probability in each list or NB IoT devices may be non-uniformly distributed using the method of B-1. In order for an NB IoT device to select a specific D-PRB list from L D-PRB lists, criteria (e.g., NB IoT device ID or NB IoT device group ID) that can be recognized by NB IoT devices in an idle state without information exchange with the eNB can be used. The NB IoT device and the eNB can select a D-PRB list to be used by the specific NB IoT device on the basis of such criteria and use D-PRB candidates included in the list while hopping the D-PRB candidates. Hopping in the D-PRB list can be performed on the basis of the ID of the NB IoT device or an NB IoT device group having the same service or purpose. Alternatively, all NB IoT devices sharing a D-PRB list may have the same hopping pattern. Here, D-PRBs included in each D-PRB list may be repeatedly used in different D-PRB lists. Further, the numbers of D-PRBs included in D-PRB lists may be different values. When a plurality of D-PRB lists are present, hopping between lists may be applied similarly to D-PRB hopping in a D-PRB list. Here, timing information (e.g., SFN) that can be selected by NB IoT devices in an idle state without additional information exchange with the eNB may be used as criteria by which a specific NB IoT device selects a D-PRB list to be used. Further, the eNB may designate a D-PRB list index order and transmit the D-PRB list index order to NB IoT devices in order to support D-PRB list hopping. The eNB may transmit the order information through a signal that can be received by NB IoT devices in an idle state, such as an RRC signal.

The eNB may support the aforementioned operation or not according to whether D-PRB hopping is required. For example, on the assumption that it is determined that PRBs in a D-PRB list can support a high-reliability channel with a high probability or a specific NB IoT device or NB IoT device group needs to be configured to use a designated PRB, the eNB may cause the NB IoT device not to use D-PRB hopping. To perform such an operation, the eNB can broadcast the corresponding information to the NB IoT device through information such as an RRC signal that can be accessed by NB IoT devices in an idle state. For example, this information can be signaled by the eNB to NB IoT devices through SIB.

When a D-PRB hopping pattern is used, the position of a subframe in which a D-PRB occurs may overlap the position of an invalid subframe at a specific timing. The invalid subframe refers to a subframe that cannot be used for other purposes due to transmission of NPSS/NSSS/NPBCH/NB-SIB, and the like. In this case, to guarantee transmission of other signals for a higher-priority purpose, one of the following operations can be performed for D-PRB operation.

Option B-1. Abandonment of transmission for D-PRB in a corresponding D-PRB subframe Option B-2. Delay of a corresponding D-PRB subframe by predefined subframes #n Option B-3. Hopping a corresponding D-PRB once in a D-PRB hopping order When the option B-1 is used, an NB IoT device can abandon monitoring of a D-PRB in a subframe of the D-PRB. When the option B-2 is used, the eNB transmits information necessary for a D-PRB after subframes delayed from the position of the D-PRB and the NB IoT device monitors the D-PRB at the same timing. Here, the delayed timing may be determined such that it is not accumulated in the following D-PRB timing calculation and does not affect the calculation. In the option B-3, when an invalid subframe and a D-PRB subframe collide with each other, the NB IoT device may be configured to hop the corresponding D-PRB in the D-PRB list and to select the next D-PRB. Here, D-PRB hopping operation may be applied only to NB IoT devices that have collided with invalid subframes. Further, all NB IoT devices using the same D-PRB list may exclude a D-PRB corresponding to invalid subframe generation timing from the D-PRB list and perform calculation for D-PRB selection.

II-2. PRB Hopping for Paging

A CSS in which a PDCCH including control information about a paging signal is transmitted may be present on a PRB for paging. In addition, a PDSCH carrying an actual paging signal may be present on the PRB for paging. The IoT device can select the PRB for paging on the basis of the ID thereof and SFN.

II-3. PRB Hopping for NPRACH Procedure

A PRB to hop can be used for the IoT device to receive the second and fourth messages of an NPRACH procedure. An uplink PRB in which the first and third messages of the NPRACH procedure are transmitted may be a PRB in a corresponding relationship with a downlink PRB for reception of the second and fourth messages of the NPRACH procedure. The NB IoT device can select a PRB for the NPRACH procedure on the basis of the ID thereof and SFN. When selection is performed on the basis of the ID of the NB IoT device and SFN in this manner, the NB IoT device can select a PRB at the same position as a PRB for a paging process as a PRB for the NPRACH procedure. Here, a stand-alone PRB index designation method may be used.

II-4. PRB Hopping for Multicast Process

A PRB to hop can be used to receive control information and traffic information of SC-MCCH and/or SC-MTCH. An NB IoT device can select a PRB in which the NB IoT device will monitor a CSS at a specific timing from a PRB list received from the eNB. Here, a PRB list may be changed according to a purpose such as a service or an application expected by each NB IoT device. The NB IoT device can select a PRB list suitable for the purpose thereof. It may be assumed that all NB IoT devices expect the same information in PRB lists selected according to purposes such as services or applications. Accordingly, an additional PRB selection method using an NB IoT device ID is not applied, and all NB IoT devices that monitor the same PRB list may be configured to expect corresponding information in the same PRB. Further, different PRB lists may be determined for SC-MCCH and SC-MTCH.

II-5. PRB Hopping for OTDOA

The corresponding PRB may be a PRB through which an NB IoT device receives a signal such as an NPRS (Narrowband Positioning Reference Signal) in order to support OTDOA, for example. The NPRS can be defined as a PRS (Positioning Reference Signal) designed in consideration of the size of a reduced bandwidth (i.e., narrowband) used by NB IoT devices. When the NB IoT device uses a signal used in LTE/LTE-A in addition to the NPRS in order to perform positioning, a PRB including the signal can also be included in a PRB list. For example, when an NSSS or an NRS of NB-IoT is used or a CRS or a PRS of LTE/LTE-A is used in an in-band operation scenario for positioning of an NB-IoT device, the NB IoT device can include the corresponding PRB in a PRB list. In the case of hopping of PRBs in which legacy signals are received, a timing at which the NB IoT device monitors the PRBs may be dependent on a timing at which each signal is received. The NB IoT device can monitor a PRB corresponding to the corresponding subframe timing as necessary. If a timing at which a legacy signal that can be used for positioning is received and an NPRS reception timing overlap and thus one of the signals needs to be selected, the NB IoT device can be configured to receive the NPRS for higher accuracy. On the other hand, the eNB may abandon NPRS transmission and the NB IoT device may perform positioning using a legacy signal in order to reduce overhead additionally generated in the eNB. To perform the aforementioned operation, the eNB (or a location server) needs to inform NB IoT devices of information on a PRB list. The PRB list signaled by the eNB (or the location server) to NB IoT devices may include positions at which NPRSs are transmitted. Each NB IoT device may include PRBs in which legacy LTE/LTE-A signals available for positioning are transmitted in the PRB list on the basis of preliminary information as necessary. An NB IoT device needs to receive NPRSs of other cells when it supports OTDOA. To this end, the eNB (or the location server) can inform the NB IoT device of information about NPRSs used in neighbor cells. For this, the eNB (or the location server) can notify the information about NPRSs of neighbor cells through an RRC signal and/or an LPP signal. A PRB hopping pattern for positioning needs to be determined on the basis of a value that can be equally applied to a reference cell in which the NB IoT device receives NPRSs and neighbor cells. For example, a specific location server may designate a hopping ID by which the same hopping pattern can be applied to cells that use NPRSs together. This information is delivered to an eNB of each cell and the eNB can inform NB IoT devices of the information. To perform operations of the aforementioned options B-1, B-2 and B-3 with respect to positioning, information about an invalid subframe of a neighbor cell as well as information about an invalid subframe of a reference cell are necessary. To this end, the eNB (or the location server) can notify information about an invalid subframe of a neighbor cell through information such as an RRC signal and/or an LPP signal. When the method of the option B-1 is used, an NB IoT device may use legacy LTE/LTE-A signals instead of NPRS measurement.

When PRB hopping for positioning is supported or one node transmits an NPRS through a plurality of PRBs for other reasons, collocation information of PRBs used for NPRS transmission can be signaled to an NB IoT device. For example, PRBs that can be used by the NB IoT device to perform positioning by being combined on the assumption that the PRBs have the same physical characteristic (e.g., geometry) may be present. Accordingly, the eNB can inform the NB IoT device of collocation information by indicating such PRBs. As a method of notifying collocation information, PRBs assumed to have the same physical characteristic (e.g., geometry) when a PRB list is transmitted can be included in an independent PRB list. That is, a PRB list can be generated per physical characteristic (e.g., geometry) and a plurality of distinguished PRB lists can be transmitted to the NB IoT device. In this case, the NB IoT device can be aware of PRBs that can be combined for each physical characteristic (e.g., geometry) and thus can acquire collocation information and discriminate targets to be combined from NPRSs transmitted on a plurality of PRBs from the eNB. That is, the NB IoT device can assume that PRBs in a PRB list are present at a collocation having the same physical characteristic (e.g., geometry).

Figure 11:
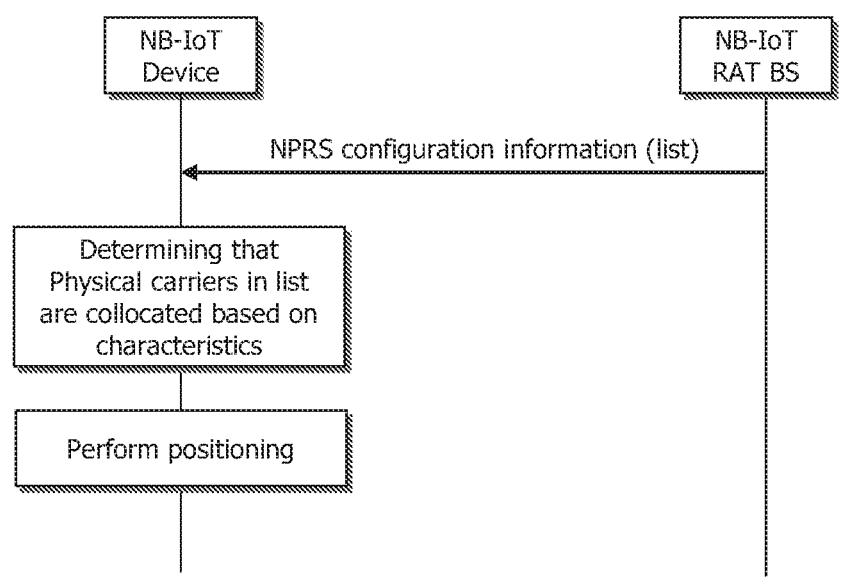
FIG. 11 illustrates an example of using a PRB for positioning (e.g., OTDOA) according to the second disclosure of the present specification.

FIG. 11 illustrates an example of using a PRB for positioning (e.g., OTDOA) according to the second disclosure of the present specification.

Referring to FIG. 11, an NB IoT device receives information including an NPRS configuration of a cell from an eNB. The information may include a list. Here, the list can indicate carriers (i.e., PRBs) of a serving cell (or a reference cell) through which NPRSs are received.

The NB IoT device considers/determines that physical characteristics (i.e., geometry) (e.g., antenna ports) of subcarriers of the serving cell (or the reference cell) in the list are collocated. In addition, the NB IoT device can combine NPRSs received on a plurality of PRBs of the serving cell (or the reference cell) to perform positioning on the basis of the consideration/determination.

The information received from the eNB may also include a list of carriers (i.e., PRBs) of a neighbor cell. Accordingly, the NB IoT device considers/determines that physical characteristics (i.e., geometry) (e.g., antenna ports) of the carriers of the neighbor cell in the list are collocated. In addition, the NB IoT device can combine NPRSs received on a plurality of PRBs of the neighbor cell to perform positioning on the basis of the consideration/determination.

Alternatively, a method of limiting only non-anchor PRBs (or non-anchor carriers) a predetermined distance from an anchor PRB (or anchor carrier) on the frequency axis to PRBs available for positioning and notifying positional information of the anchor PRB (or anchor carrier) that can be criteria for each physical characteristic (e.g., geometry) may be used. To this end, both the NB IoT device and the eNB need to know information about offset values of indexes of non-anchor PRBs (or non-anchor carriers) available for positioning with respect to the anchor PRB (or anchor carrier) as a predefined value. If PRBs used for positioning are predefined by a specific pattern in this manner, the NB IoT device can be aware of the positions of PRBs that can be combined only using the positional information about the anchor PRB (or anchor carrier). If one or more offset values between indexes of non-anchor PRBs (or non-anchor carriers) and an anchor PRB (or anchor carrier) for positioning are defined, the offsets may be arranged in a table. In this case, the eNB can signal which value of the offsets in the table will be used to the NB IoT device through information such as SIB. As another method for estimating collocation information, the eNB can signal information about non-anchor PRBs (or non-anchor carriers) used for positioning to the NB IoT device for each anchor PRB (or anchor carrier). The NB IoT device can distinguish PRBs that can be combined on the basis of the information. The eNB can transmit offsets of the aforementioned frequency/PRB indexes or a list of PRBs that can be combined to the NB IoT device through SIB on an anchor PRB (or anchor carrier) or an RRC signal dedicated to each NB IoT device. Further, the eNB may transmit information about neighbor eNBs of the NB IoT device in the same manner.

In addition, when the eNB signals information on collocated PRBs, the eNB can also signal a cell ID of the related PRBs or NPRS configuration (or PRS configuration) information to the NB IoT device. For example, when a collocated PRB group uses the same cell ID or NPRS configuration (or PRB configuration) information, the NB IoT device can receive information thereon. As another example, when a plurality of cell IDs or a plurality of pieces of NPRS configuration (or PRS configuration) information are used in a collocated PRB group, the NB IoT device may receive all information thereon from the eNB.

Alternatively, the NB IoT device can assume that all PRBs configured to receive NPRSs and a corresponding anchor PRB (or anchor carrier) are collocated and combine the NPRSs. Further, PRBs in which NPRSs are transmitted other than an anchor PRB (or anchor carrier) of a serving node or a neighbor node can be represented as PRB/frequency offsets with respect to the anchor PRB (or anchor carrier) and transmitted to the NB IoT device.

The above description can also be applied to measurement through combining of other signals such as an NRS (e.g., RSRP measurement).

When NPRS measurement is performed on different PRBs on the basis of hopping, the NB IoT device can perform positioning by combining measurements of NPRSs transmitted in consecutive different PRBs. For example, when NPRS measurement is performed through N consecutive subframes, a PRB in which the NB IoT device performs measurement in M(<N) subframes may differ from a PRB in which the NB IoT device performs measurement in (N−M) subframes. This may be because NPRSs cannot be observed on consecutive subframes through one PRB due to collision with signals for other purposes or may be for the purpose of observing a plurality of PRBs to obtain frequency diversity effects. In this case, the NB IoT device may need to know a power boosting value between two PRBs in order to use a result of combining of NPRSs through different PRBs. For example, power boosting may be applied in some PRBs to transmit NPRSs and may not be applied in some PRBs. To support this, the eNB needs to notify the NB IoT device whether NPRS is power-boosted in each PRB. This information can be determined as a fixed power boosting value for each PRB. In this case, the eNB transmits NPRSs by applying fixed power boosting according to a power boosting value determined for each PRB and the NB IoT device can expect this value. Further, power boosting values may be different in one PRB according to different subframes or NPRS occasion. In this case, the eNB can notify the NB IoT device of power boosting information in the form of a bitmap. This has an advantage that more dynamic power booting is applicable. Alternatively, information about a fixed occasion and periodicity may be signaled to the NB IoT device. This may be for the purpose of relatively reducing overload with respect to information about power boosting. The proposed two methods for indicating a power boosting value may be used in a combined manner. Discrimination between different PRBs can be determined on the basis of an anchor PRB (or anchor carrier) and a non-anchor PRB (or non-anchor carrier). In this case, power boosting of NPRS on the non-anchor PRB (or non-anchor carrier) can be determined as a relative rate with respect to the anchor PRB (or anchor carrier). Information about NPRS power boosting proposed in this section can be transmitted to the NB IoT device through a method such as SIB or RRC signaling. The above-described methods can be equally applied to downlink signal transmission on a plurality of D-PRBs proposed in section III of the present specification.

In the case of PRB hopping for NPRS measurement, a timing gap for retuning time can be configured before and after a hopping timing. The NB IoT device and the eNB can determine a period in which an NPRS is not transmitted in consideration of the timing gap at a PRB hopping occurrence timing. The timing gap can be operated in units of a subframe (or slot) for resource operation efficiency. In this case, the timing gap can be determined as N arbitrary subframes (or slots). If the size of the timing gap is configurable, the eNB can determine the size of the timing gap and inform the NB IoT device of the determined size of the timing gap through a method such as SIB or RRC signaling. Alternatively, the timing gap can be determined in units of a symbol. This may be for the purpose of reducing waste of NPRS measurement time occurring due to the timing gap. When this method is used, the number of symbols that can be combined in one subframe may differ from that in another subframe, and thus an operation for compensating for this or information for reflecting this may be necessary. To this end, the eNB can configure the number of symbols configured as a gap and inform the NB IoT device of this information through SIB or RRC signaling. The aforementioned methods can be equally applied to transmission of a downlink signal on a plurality of D-PRBs proposed in section III of the present specification.

In addition, other DL operations may not be performed in a predetermined subframe period before and after a subframe in which the NB IoT device performs NPRS monitoring in consideration of a retuning time that can be generated when a PRB for NPRS measurement differs from a PRB for reception of other DL signals. This operation may be for the purpose of considering a processing time delay for the NB IoT device to perform downlink signal or NPRS measurement. The eNB can inform the NB IoT device of information about the size of such a gap through SIB or RRC signaling. The aforementioned methods can be equally applied to transmission of a downlink signal on a plurality of D-PRBs proposed in section III of the present specification.

When NPRS measurement can be performed in a plurality of PRBs, PRBs in which NPRS monitoring can be performed may be determined to be the same in all PRBs. Accordingly, a subframe in which an NPRS can be transmitted can be arranged between PRBs by aligning the positions of invalid subframes. Further, subframe positions at which the NB IoT device can perform monitoring may be aligned through positional information about an NPRS. Here, the positional information may be determined in the form of a bitmap and/or may be a parameter such as repetition or starting occasion. This method can reduce overhead because subframe position information about all available NPRS PRBs is transmitted through the same overhead. In addition, NPRS monitoring can be continuously performed even in the case of hopping of a PRB position at which the NB IoT device monitors an NPRS.

III. Third Disclosure: Transmission of Downlink Signal on Multiple D-PRBs

To cope with cases in which a specific D-PRB is a PRB that is not suitable for a specific NB IoT device, an eNB can transmit the same downlink information on a plurality of D-PRBs. An NB IoT device can detect and select a D-PRB suitable therefor from selectable D-PRBs. The eNB may know a set of D-PRBs selected by a specific NB IoT device but may not know which PRB is selected as a D-PRB from the set. Accordingly, the eNB can transmit the same downlink signal on all D-PRBs selectable by the NB IoT device. A plurality of D-PRBs through which the eNB performs transmission to an NB IoT device can be selected as follows.

C-1.a) Selecting a plurality of D-PRBs from one D-PRB list

C-1.b) Selecting one D-PRB list from a plurality of D-PRB lists

In C-1.a, the eNB can transmit a D-PRB list including a plurality of D-PRBs through a signal (e.g., SIB) that can be received by an NB IoT device in an idle state. The NB IoT device in an idle state can select one or more D-PRBs according to selectable criteria (e.g., NB IoT device ID or NB IoT device group ID) without the aid of information additionally signaled by the eNB. The number of D-PRBs selectable by the NB IoT device can be determined by the eNB and broadcast through information that can be received by an NB IoT device in an idle state, such as an RRC signal. Here, the eNB may determine different numbers of D-PRBs to be selected for NB IoT device IDs or NB IoT device group IDs. Alternatively, the number of D-PRBs selectable by an NB IoT device is not determined in advance and the number of D-PRBs selected by an NB IoT device is determined on the basis of the number of D-PRBs belonging to a D-PRB list. The NB IoT device reselects a D-PRB in which it performs monitoring from a plurality of selected D-PRBs.

When one or more D-PRB lists are present according to C-1.b, an NB IoT device in an idle state can select one of the D-PRB lists according to selectable criteria (e.g., NB IoT device ID or NB IoT device group ID) without the aid of information additionally signaled by the eNB. The NB IoT device can select one D-PRB from the selected D-PRB list. Here, different numbers of D-PRBs may be included in the respective D-PRB lists.

Meanwhile, a D-PRB to be monitored can be selected from a plurality of D-PRBs selectable by an NB IoT device (or D-PRBs belonging to a selected D-PRB list) as follows.

C-2.a) Randomly hopping D-PRBs to select a D-PRB

C-2.b) Selecting a D-PRB through NRS measurement

According to C-2.a, an NB IoT device randomly selects a D-PRB to be monitored thereby. Here, the selected D-PRB may be changed at a monitoring timing and may be represented by a function according to time.

According to C-2.b, the NB IoT device can select a D-PRB advantageous therefor from a plurality of selectable D-PRBs (or D-PRBs belonging to a D-PRB list) through NRS measurement. For example, the NB IoT device can select a D-PRB to be monitored thereby through measurement such as RSRP or RSRQ.

III-1. Selection of PRB for Paging

A CSS in which a PDCCH including control information about a paging signal may be present on a PRB for paging. Further, a PDSCH on which an actual paging signal is transmitted may be present on the PRB for paging. The aforementioned IoT device can select the PRB for paging on the basis of the ID thereof.

III-2. Selection of PRB for NPRACH Procedure

The corresponding PRB can be used for the aforementioned IoT device to receive the second and fourth messages of an NPRACH procedure. An uplink PRB in which the first and third messages of the NPRACH procedure are transmitted may be a PRB in a corresponding relationship with a downlink PRB for reception of the second and fourth messages of the NPRACH procedure. The NB IoT device can select a PRB for the NPRACH procedure on the basis of the ID thereof. When selection is performed on the basis of the ID of the NB IoT device and SFN, the NB IoT device can select a PRB at the same position as a PRB for a paging process as a PRB for the NPRACH procedure. Here, a stand-alone PRB index designation method may be used.

III-3. Selection of PRB for Multicast Process

The corresponding PRB can be used to receive control information and traffic information of SC-MCCH and/or SC-MTCH. An NB IoT device can select a PRB in which the NB IoT device will monitor a CSS at a specific timing from a PRB list received from the eNB. Here, a PRB list may be changed according to a purpose such as a service or an application expected by each NB IoT device. The NB IoT device can select a PRB list suitable for the purpose thereof. Further, different PRB lists may be determined for SC-MCCH and SC-MTCH.

III-4. PRB Hopping for OTDOA

The corresponding PRB may be a PRB through which an NB IoT device receives a signal such as an NPRS (Narrowband Positioning Reference Signal) in order to support OTDOA, for example. The eNB can transmit NPRSs in a plurality of PRBs at the same timing. The NB IoT device can select a PRB necessary therefor from a plurality of PRBs to perform positioning. When the NB IoT device uses a signal used in LTE/LTE-A in addition to the NPRS in order to perform positioning, a PRB including the signal can also be included in a PRB list. For example, when an NSSS or an NRS of NB-IoT is used or a CRS or a PRS of LTE/LTE-A is used in an in-band operation scenario for positioning of an NB-IoT device, the NB IoT device can include the corresponding PRB in a PRB list. If a timing at which a legacy signal that can be used for positioning is received and an NPRS reception timing overlap and thus one of the signals needs to be selected, the NB IoT device can be configured to receive the NPRS for higher accuracy. On the other hand, the eNB may abandon NPRS transmission and the NB IoT device may perform positioning using a legacy signal in order to reduce overhead additionally generated in the eNB. To perform the aforementioned operation, the eNB (or a location server) needs to inform NB IoT devices of information on a PRB list. The PRB list signaled by the eNB (or the location server) to NB IoT devices may include positions at which NPRSs are transmitted. Each NB IoT device may include PRBs in which legacy LTE/LTE-A signals available for positioning are transmitted in the PRB list on the basis of preliminary information as necessary. The NB IoT device needs to receive NPRSs of other cells when it supports OTDOA. To this end, the eNB (or the location server) can inform the NB IoT device of information about NPRSs used in neighbor cells. For this, the eNB (or the location server) can notify the information about NPRSs of neighbor cells through an RRC signal and/or an LPP signal.

IV. Fourth Disclosure: Configuration of Large Repetition Number on Non-Anchor PRB (or Non-Anchor Carrier)

An anchor PRB (or anchor carrier) can have high channel quality in general because an NB IoT device measures the channel quality to determine the anchor PRB. However, channel quality information about a non-anchor PRB (or non-anchor carrier) cannot be acquired from an NB IoT device in an idle state in a process through which an eNB selects the non-anchor PRB (or non-anchor carrier) as a D-PRB. Accordingly, a non-anchor PRB (or non-anchor carrier) having low channel quality may be selected as a D-PRB. To solve such a problem, when a non-anchor PRB (or non-anchor carrier) is selected as a D-PRB, a method of using a higher repetition number on the non-anchor PRB (or non-anchor carrier) can be conceived.

Figure 12:
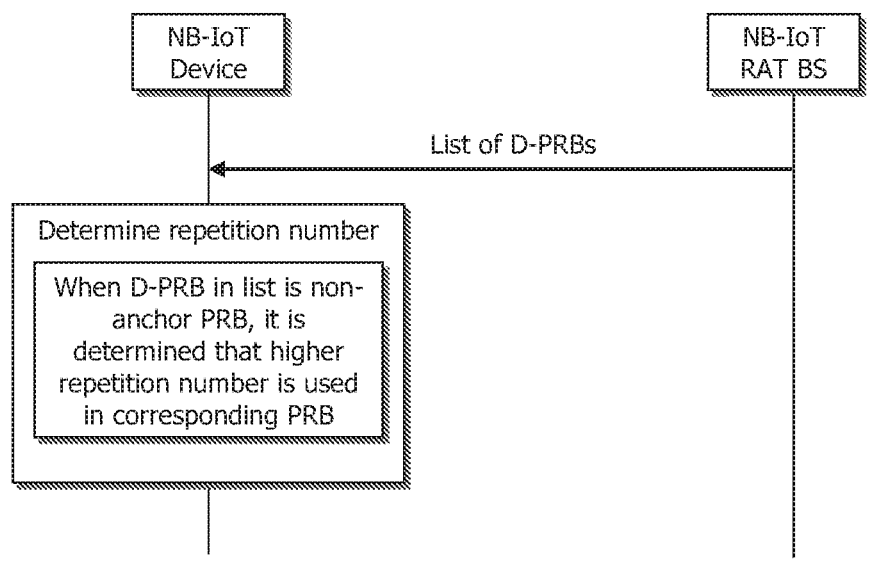
FIG. 12 is an illustration of a method according to a fourth disclosure of the present specification.

FIG. 12 is an illustration of a method according to the fourth disclosure of the present specification.

As seen with reference to FIG. 12, an NB IoT device receives a list of D-PRBs. The list can indicate carriers of the D-PRBs.

The NB IoT device can determine a repetition number. Specifically, when a D-PRB indicated in the list is a non-anchor PRB, the NB IoT device can determine that a higher repetition number is used in the PRB.

This method has the advantage that additional signaling or additional operation of the NB IoT device for guaranteeing channel quality of a non-anchor PRB (or non-anchor carrier) does not occur. As a most fundamental operation method, it is possible to cause the same repetition level to be used for both an anchor PRB (or anchor carrier) and a non-anchor PRB (or non-anchor carrier) without discriminating a repetition level of the anchor PRB (or anchor carrier) from a repetition level of the non-anchor PRB (or non-anchor carrier). To this end, the repetition level of the non-anchor PRB (or non-anchor carrier) may be determined to conform to the repetition level determined for the anchor PRB (or anchor carrier). In this case, there is an advantage that additional signaling for designating different repetition levels is not required.

To designate different repetition levels for an anchor PRB (or anchor carrier) and a non-anchor PRB (or non-anchor carrier), the eNB can transmit additional information for designating a repetition level in the non-anchor PRB (or non-anchor carrier) through a signal (e.g., an RRC signal) that can be received by NB IoT devices in an idle state. The transmitted information may be a repetition number value used when a D-PRB is operated in the non-anchor PRB (or non-anchor carrier). For example, a maximum of $2^n$ repetition numbers can be operated when n bits are used. For example, a set of values determining a repetition level can be represented as {r1, r2, r3, r4} when a repetition level of a non-anchor PRB (or non-anchor carrier) is configured using two bits. Each value can be represented by an arbitrary integer. This value may directly designate a value of a repetition number that can be used in a non-anchor PRB (or non-anchor carrier). Further, the aforementioned value may be determined as a value added to a repetition number used in an anchor PRB (or anchor carrier). Here, a value of a repetition number used in the non-anchor PRB (or non-anchor carrier) can be selected within a range of repetition levels that can be used in the anchor PRB (or anchor carrier). Further, information signaled by the eNB may be represented as an index in a table of repetition levels. For example, a value transmitted by the eNB may be an index that indicates a value in the repetition level table. The aforementioned NB IoT device can use a value of a repetition number indicated by the index in the table. Further, the value transmitted by the eNB may indicate the amount of indexes added to or subtracted from an index used in the anchor PRB (or anchor carrier).

Alternatively, the eNB may transmit 1-bit signaling indicating whether to use a larger repetition number in a non-anchor PRB (or non-anchor carrier). When 1-bit signaling is used, an NB IoT device can determine a repetition number to be used in a non-anchor PRB (or non-anchor carrier) by adding a predefined fixed value to a value of a repetition number used in an anchor PRB (or anchor carrier). If bit signaling indicates that a high repetition number is not supported, D-PRBs operated in an anchor PRB (or anchor carrier) can be configured to use the same repetition number.

IV-1. Determination of Repetition Number on PRB for Paging

A CSS in which a PDCCH including control information about a paging signal is transmitted may be present on a PRB for paging. Further, a PDSCH over which an actual paging signal is transmitted may be present on the PRB for paging. Here, an NB IoT device can determine a repetition number for a CSS (i.e., a PDCCH) according to whether a PRB monitored thereby is an anchor PRB (or anchor carrier) or a non-anchor PRB (or non-anchor carrier).

IV-2. Determination of Repetition Number on PRB for NPRACH Procedure

The corresponding PRB can be used for the aforementioned IoT device to receive the second and fourth messages of an NPRACH procedure. Here, the NB IoT device can determine a repetition number according to whether a PRB monitored for reception of the second and fourth messages is an anchor PRB (or anchor carrier) or a non-anchor PRB (or non-anchor carrier). An uplink PRB in which the first and third messages of the NPRACH procedure are transmitted may be a PRB in a corresponding relationship with a downlink PRB for reception of the second and fourth messages of the NPRACH procedure.

IV-3. Determination of Repetition Number on PRB for Multicast Process

The corresponding PRB can be used to receive control information and traffic information of SC-MCCH and/or SC-MTCH. An NB IoT device can determine a repetition level for a common search space (CSS) according to whether the corresponding PRB is an anchor PRB (or anchor carrier) or a non-anchor PRB (or non-anchor carrier). Further, different PRBs may be determined for SC-MCCH and SC-MTCH. If different PRBs are configured for SC-MCCH and SC-MTCH or SC-MCCH and SC-MTCH are transmitted in a distinguished manner for respective purposes such as services or applications, selection of a PRB for each purpose may be configured differently. In this case, a repetition level of each PRB can be independently determined.

V. Fifth Disclosure: Configuration of D-PRB List Based on Feedback from NB IoT Device in Connected State As a method for selecting an appropriate non-anchor PRB (or non-anchor carrier), NB IoT devices in a connected state may also feed back RSRP and/or RSRQ information when transmitting uplink traffic and an eNB may determine an appropriate D-PRB list on the basis of this information. This method uses a technique of reducing a probability that an NB IoT device is assigned inferior D-PRBs by reflecting average channel quality of NB IoT devices instead of performing, by an NB IoT device in an idle state, an operation of selecting an appropriate D-PRB suitable therefor or an additional operation for compensating for a case in which a D-PRB is not appropriate. Instead, an NB IoT device can feed back a channel quality measurement result value with respect to a D-PRB used thereby, such as RSRP and/or RSRQ, to the eNB when attempting to be connected to the eNB. The eNB can determine a D-PRB list to be operated thereby on the basis of such feedback information of the NB IoT device with respect to channel quality. If it is determined that a channel quality measurement result value with respect to a specific D-PRB is not satisfactory as a feedback result, the eNB can remove the D-PRB from the D-PRB list and add a new D-PRB to the list. For example, when information about the D-PRB list is transmitted to an NB IoT device in an idle state through SIB, the updated D-PRB list can be transmitted to the NB IoT device through a signal such as a SIB change notification.

Here, since the eNB can identify an NB IoT device that has transmitted feedback information when receiving the feedback information from the NB IoT device, the eNB can generate different D-PRB lists for NB IoT device groups. For example, in the case of a group of NB IoT devices supporting a specific application, since there is a high probability that the NB IoT devices are present in stochastically similar coverages, different coverage enhancement levels are set for respective applications and D-PRB lists according thereto may be configured.

Information fed back from an NB IoT device may be quantized information of channel quality such as RSRP and/or RSRQ. For example, when n bits have been allocated to feedback information about channel quality, an NB IoT device can quantize a channel quality measurement value thereof with respect to a specific D-PRB into $2^n$ sections and transmit the same to the eNB through a feedback channel. Alternatively, the NB IoT device may determine whether the channel quality measurement value with respect to the specific D-PRB is equal to or greater than a predefined threshold value and feed back determination results using 1-bit information. For example, when there is a threshold value with respect to channel quality determined by the eNB through RRC signaling, the NB IoT device can compare the channel quality measurement value thereof with the threshold value to determine whether the channel quality measurement value is equal to or greater than the threshold value. In addition, the NB IoT device can transmit 1 to the eNB when the channel quality measurement value is equal to or greater than the threshold value and transmit 0 to the eNB when the channel quality measurement value is less than the threshold value, and vice versa.

A random access procedure (i.e., NPRACH procedure) may be used for such feedback of an NB IoT device. For example, all NB IoT devices need to perform a contention-based random access procedure (i.e., NPRACH procedure) in order to access a connected state, and this operation needs to be equally performed even if an NB IoT device performs any UL operation. Accordingly, all NB IoT devices in a connected state can perform the feedback operation proposed in this section. Particularly, the feedback can be performed through transmission of the third message (i.e., NPUSCH transmission) even during the NPRACH procedure.

Alternatively, an NB IoT device may perform separate channel quality feedback. Here, a physical channel used for feedback is not separately operated and a legacy physical channel may be used. For example, uplink control information such as ACK/NACK is transmitted through an NPUSCH because an uplink control channel is not separately present in NB-IoT. Accordingly, feedback information of an NB IoT device can also be transmitted through an NPUSCH. Feedback through an NPUSCH may be performed only when there is a request from the eNB. For example, only when the eNB wakes up an NB IoT device in an idle state through a paging signal or indicates a separate feedback request to an NB IoT device that has performed an NPRACH procedure, the NB IoT device can feed back measured channel quality results.

As described above, a PRB configured on the basis of feedback information from an NB IoT device may be a PRB for paging.

Alternatively, a PRB configured on the basis of feedback information from an NB IoT device may be a PRB for an NPRACH procedure. That is, the PRB may be used for the IoT device to receive the second and fourth messages of the NPRACH procedure. An uplink PRB in which the first and third messages of the NPRACH procedure are transmitted may be in a corresponding relationship with a downlink PRB for reception of the second and fourth messages of the NPRACH procedure.

Alternatively, a PRB configured on the basis of feedback information from an NB IoT device may be a PRB for multicast. That is, the PRB may be used to receive control information and traffic information of SC-MCCH and/or SC-MTCH.

The embodiment of the present invention may be achieved by various means, for example, hardware, firmware, software, or a combination thereof. This will be described in detail with reference to the drawings.

Figure 13:
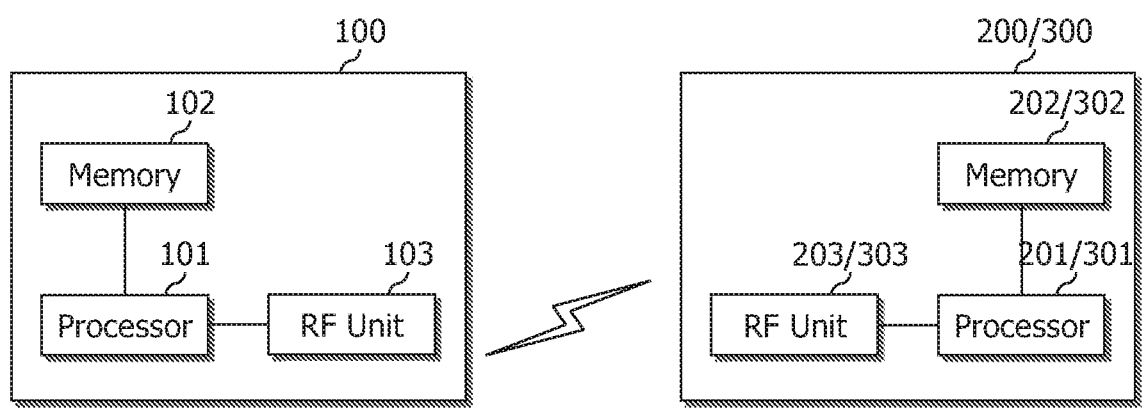
FIG. 13 is a block diagram illustrating a wireless communication system in which disclosures of the present specification are implemented.

FIG. 13 is a block diagram illustrating a wireless communication system in which the disclosures of the present specification are implemented.

An eNB 200/300 includes a processor 201/301, a memory 202/302 and an RF (Radio Frequency) unit 203/303. The memory 202/302 is connected to the processor 201/301 and stores various types of information for driving the processor 201/301. The RF unit 203/303 is connected to the processor 201/301 to transmit and/or receive RF signals. The processor 201/301 implements the proposed functions, processes and/or methods. In the above-described embodiments, operations of the eNB can be realized by the processor 201/301.

An NB IoT 100 includes a processor 101, a memory 102 and an RF unit 103. The memory 102 is connected to the processor 101 and stores various types of information for driving the processor 101. The RF unit 103 is connected to the processor 101 to transmit and/or receive RF signals. The processor 101 implements the proposed functions, processes and/or methods.

The processor may include an ASIC (Application-Specific Integrated Circuit), other chipsets, a logic circuit and/or a data processing device. The memory may include a ROM (Read-Only Memory), a RAM (Random Access Memory), a flash memory, a memory card, a storage medium and/or other storage devices. The RF unit may include a baseband circuit for processing RF signals. When the embodiments are realized by software, the above-described techniques can be realized by modules (processes, functions, etc.) that perform the above-described functions. The modules may be stored in the memory and executed by the processor. The memory may be present inside or outside the processor and may be connected to the processor through various known means.

In the above illustrative system, although the methods have been described on the basis of the flowcharts using a series of the steps or blocks, the disclosure of the present specification is not limited to the sequence of the steps, and some of the steps may be performed at different sequences from the above-described steps or may be performed simultaneously with the steps. Furthermore, those skilled in the art will understand that the steps shown in the flowcharts are not exclusive and may include other steps or one or more steps of the flowcharts may be deleted without affecting the scope of the present invention.

What is claimed is:

1. A method for measuring a position, the method performed by a wireless device and comprising:
   receiving a radio resource control (RRC) signal including information about a first frequency list and a second frequency list,
   wherein the first frequency list includes one or more frequencies which relate to a Physical Resource Block (PRB) for carrying first narrowband positioning reference signals (NPRSs) from a cell,
   wherein the second frequency list includes one or more frequencies which relate to a PRB for carrying second NPRSs from a neighbor cell;
   receiving the first NPRSs from the cell and the second NPRSs from the neighbor cell,
   measuring the position based on the first NPRSs and the second NPRSs,
   wherein the position is measured based on determination that that geometries of the first NPRSs are collocated and geometries of the second NPRSs are collocated.

2. The method of claim 1,
   wherein the geometries of the first NPRSs include physical characteristics of the carriers or antenna ports, and
   wherein the geometries of the second NPRSs include physical characteristics of the carriers or antenna ports.

3. The method of claim 1, wherein the information is received through higher layer signaling.

4. A wireless device for measuring a position, the wireless device comprising:
   a transceiver; and
   a processor configured to control the transceiver,
   wherein the processor is configured to perform processes which include:
   receiving a radio resource control (RRC) signal including information about a first frequency list and a second frequency list,
   wherein the first frequency list includes one or more frequencies which relate to a Physical Resource Block (PRB) for carrying first Narrowband Positioning Reference signals (NPRSs) from a cell,
   wherein the second frequency list includes one or more frequencies which relate to a PRB for carrying second NPRSs from a neighbor cell,
   wherein the processor is configured to receive the first NPRSs from the cell and the second NPRSs from the neighbor cell,
   wherein the processor is configured to measure the position based on the first NPRSs and the second NPRSs,
   wherein the position is measured based on determination that geometries of the first NPRSs are collocated and geometries of the second NPRSs are collocated.

5. The wireless device of claim 4,
   wherein the geometries of the first NPRSs include physical characteristics of the carriers or antenna ports, and
   wherein the geometries of the second NPRSs include physical characteristics of the carriers or antenna ports.

6. The wireless device of claim 4, wherein the information is received through higher layer signaling.

* * * * *